(12) United States Patent
Chen et al.

(10) Patent No.: US 10,936,548 B2
(45) Date of Patent: Mar. 2, 2021

(54) FILE SYNCHRONIZATION PAUSING FOR INDIVIDUAL FILES

(71) Applicant: Microsoft Technology Licensing, LLC., Redmond, WA (US)

(72) Inventors: Yisheng Chen, Issaquah, WA (US); Amnon Itamar Govrin, Bellevue, WA (US); Francisco Jose Garcia-Ascanio, Redmond, WA (US); Jack Allen Nichols, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 15/199,296

(22) Filed: Jun. 30, 2016

(65) Prior Publication Data

US 2017/0270136 A1    Sep. 21, 2017

Related U.S. Application Data

(60) Provisional application No. 62/308,738, filed on Mar. 15, 2016.

(51) Int. Cl.
*G06F 16/178* (2019.01)
*G06F 16/13* (2019.01)
*G06F 16/182* (2019.01)

(52) U.S. Cl.
CPC ............ *G06F 16/178* (2019.01); *G06F 16/13* (2019.01); *G06F 16/184* (2019.01)

(58) Field of Classification Search
CPC ......... G06F 17/30174; G06F 17/30091; G06F 17/30212
See application file for complete search history.

(56) References Cited

U.S. PATENT DOCUMENTS 5,993,522 A    11/1999   Huang
7,529,780 B1    5/2009   Braginsky et al.
(Continued)

OTHER PUBLICATIONS

"GoodSync Reference Manual", Retrieved from <<http://web.archive.org/web/20120817081050/http://www.goodsync.com/support/manual?format=pdf>>, Aug. 17, 2612, 69 Pages.
(Continued)

*Primary Examiner* — Robert W Beausoliel, Jr.
*Assistant Examiner* — Cheryl M Shechtman
(74) *Attorney, Agent, or Firm* — Newport IP, LLC; Han Gim

(57) ABSTRACT

Systems, components, devices, and methods for synchronizing files between a local file system and a server are provided. In an example, synchronization of individual files is paused by placing the individual files in a hold state. A non-limiting example method accesses a file stored on the local file system for synchronization with an associated file on the server and determines whether differences between the file and the associated file prevent synchronization. When determined that differences between the file and the associated file prevent synchronization, the method places the file in a hold state. The hold state pauses synchronization of the content in the file with the content of the associated file. In some examples, the method continues to synchronize topological changes to files that have been placed in the hold state and/or resumes synchronization after it is determined that the file is no longer different than the associated file.

19 Claims, 26 Drawing Sheets

(56) References Cited

U.S. PATENT DOCUMENTS

| | | | |
|---|---|---|---|
| 8,095,495 | B2 | 1/2012 | Clark et al. |
| 8,621,161 | B1* | 12/2013 | Briggs .................... G06F 16/27 |
| | | | 711/152 |
| 8,949,179 | B2 | 2/2015 | Besen et al. |
| 9,083,766 | B2 | 7/2015 | Hunter |
| 9,189,533 | B2 | 11/2015 | Wautier et al. |
| 9,208,167 | B1 | 12/2015 | Henderson |
| 9,632,892 | B1* | 4/2017 | Sledz .................... G06F 16/178 |
| 2006/0106879 | A1 | 5/2006 | Zondervan et al. |
| 2006/0242204 | A1 | 10/2006 | Karas et al. |
| 2010/0082534 | A1 | 4/2010 | Sagar et al. |
| 2013/0268480 | A1 | 10/2013 | Dorman |
| 2014/0040202 | A1 | 2/2014 | Hagan et al. |
| 2014/0201138 | A1 | 7/2014 | Dorman et al. |
| 2014/0201145 | A1 | 7/2014 | Dorman et al. |
| 2014/0379647 | A1 | 12/2014 | Smith et al. |
| 2015/0370827 | A1* | 12/2015 | Parkison ........... G06F 17/30215 |
| | | | 707/626 |
| 2017/0060702 | A1* | 3/2017 | Dave .................... G06F 16/184 |

OTHER PUBLICATIONS

"International Search Report and Written Opinion Issued in PCT Application No. PCT/US2017/021234", dated Apr. 21, 2017, 13 Pages.

Liang, et al., "SyncCS: A Cloud Storage Based File Synchronization Approach", In Journal of Software, vol. 9, No. 7, Jul. 2014, pp. 1679-1686.

"Office Action Issued in European Patent Application No. 17711965. 8", dated Apr. 15, 2020, 8 Pages.

\* cited by examiner

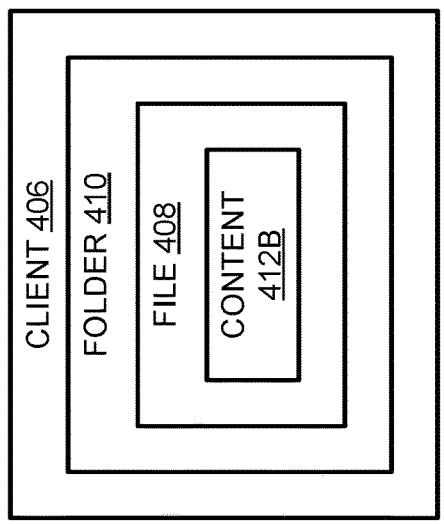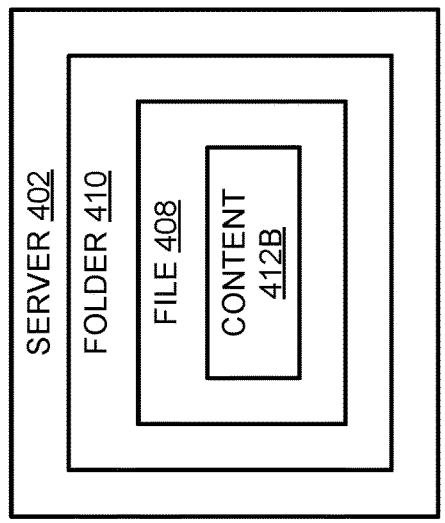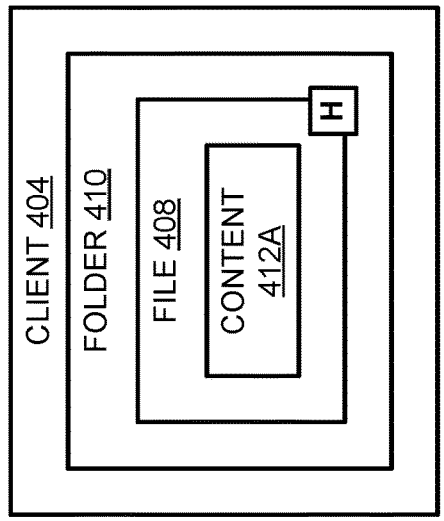
FIG. 4

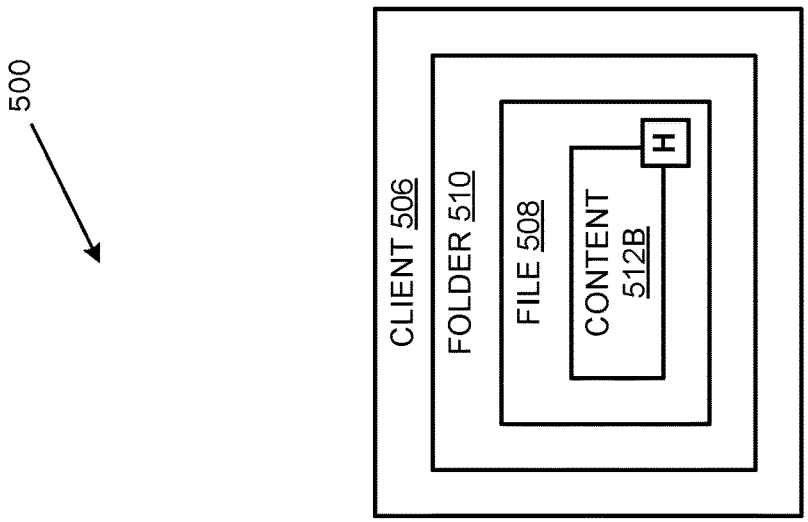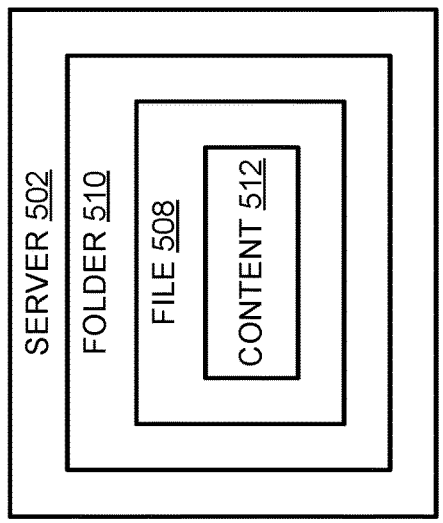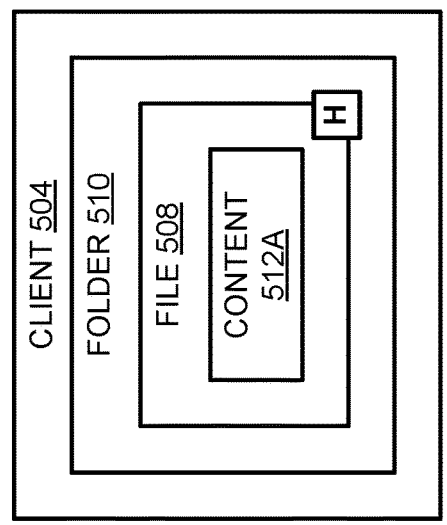
FIG. 5

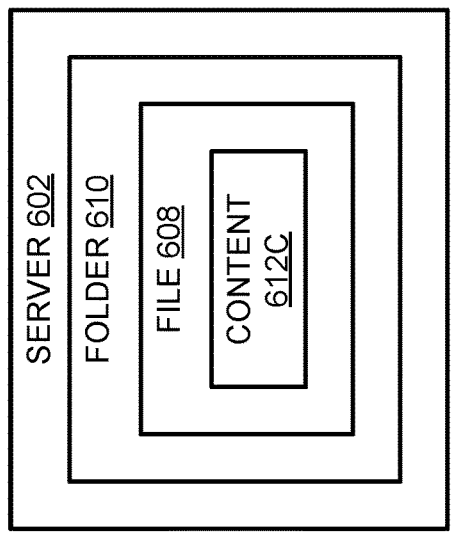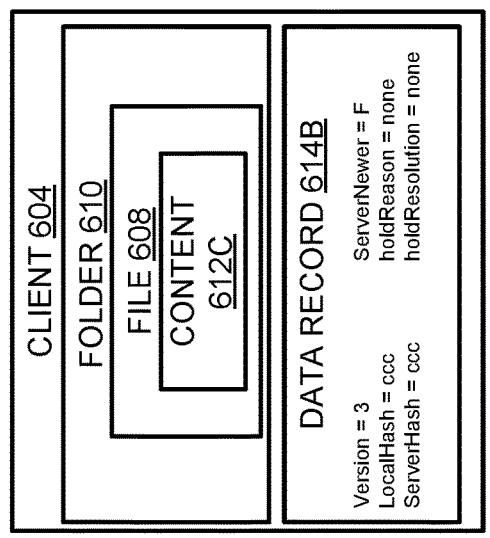
FIG. 7

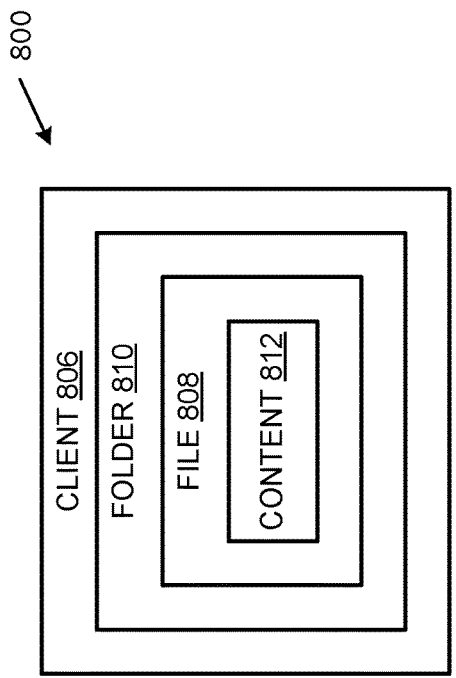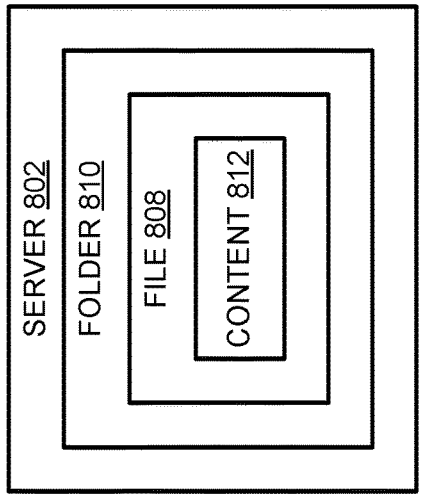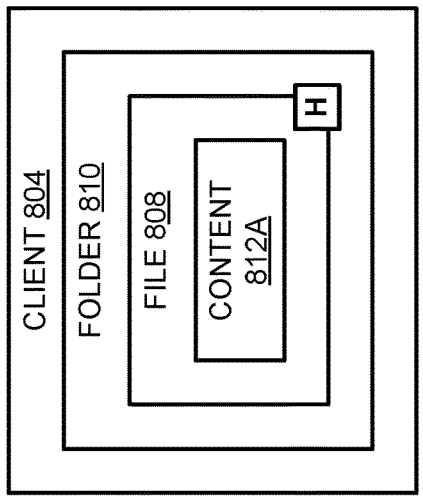
FIG. 8A
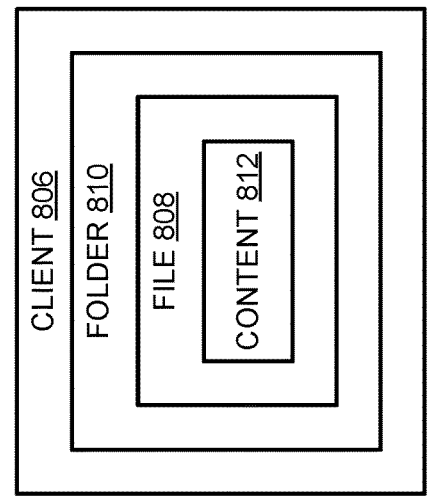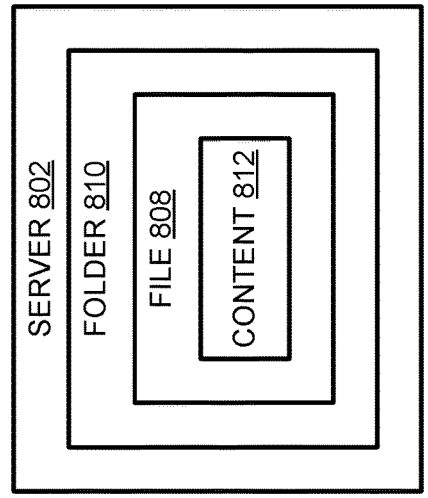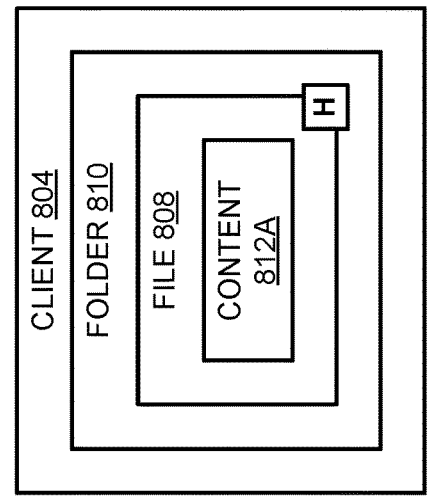
FIG. 8B

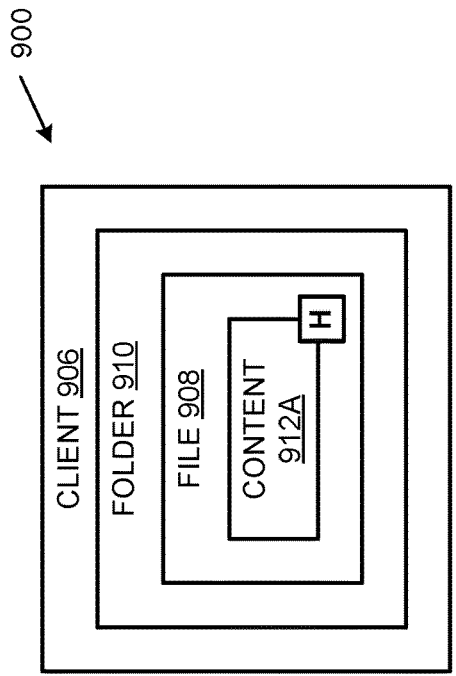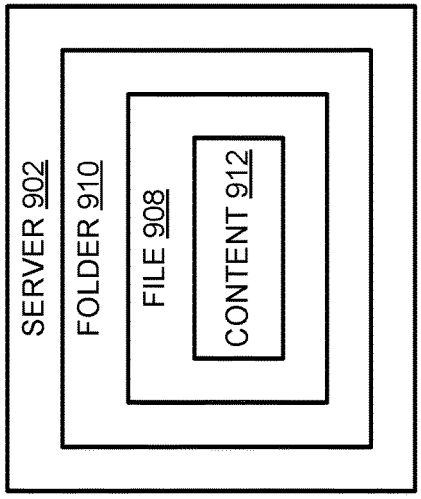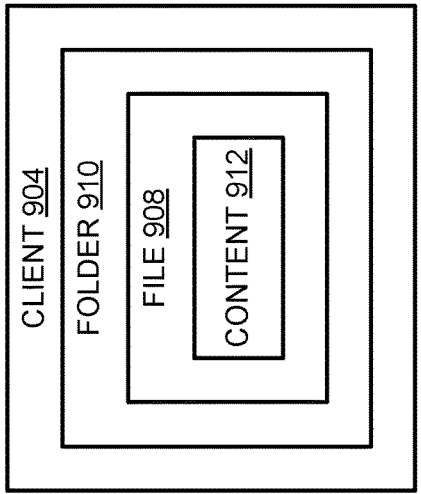
FIG. 9A
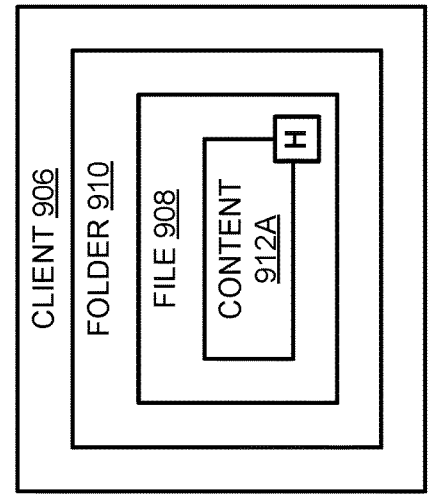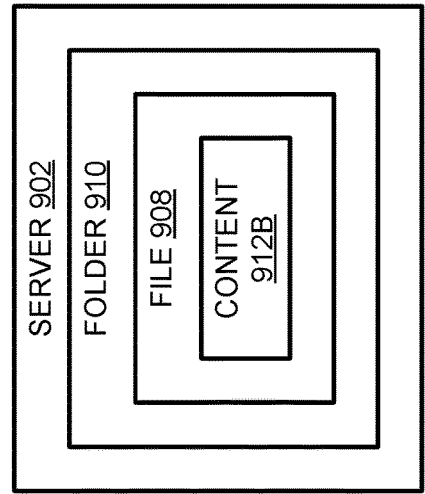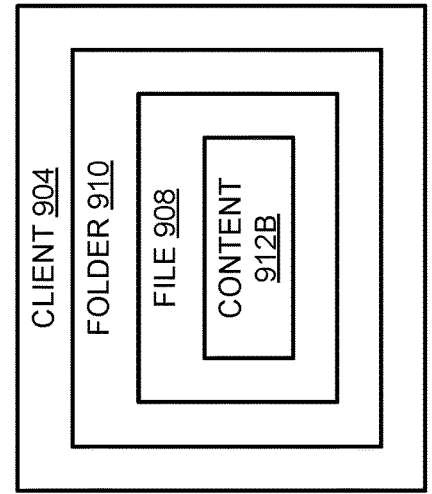
FIG. 9B

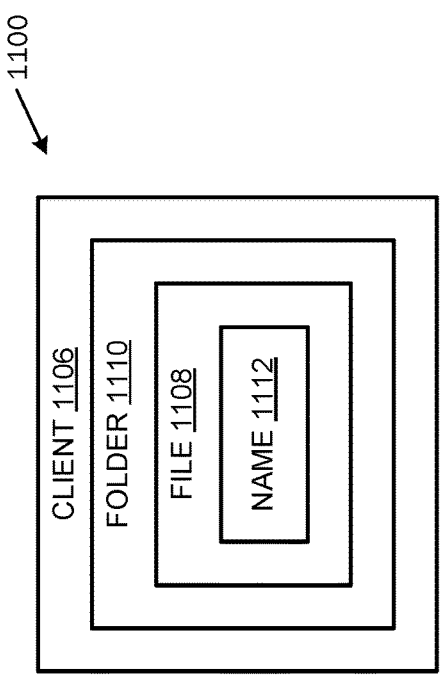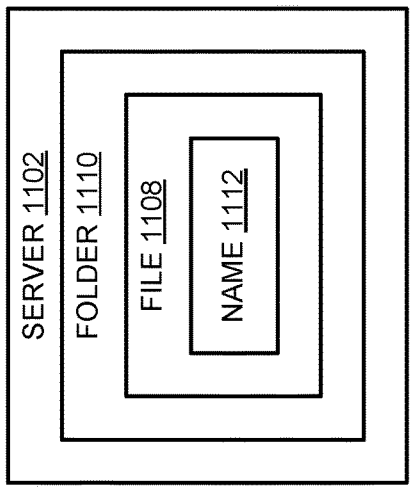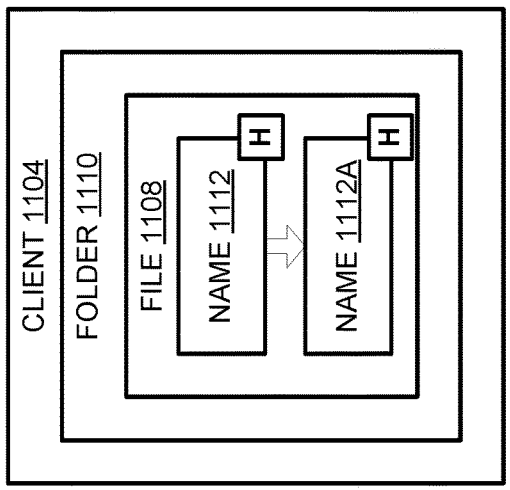
FIG. 11A
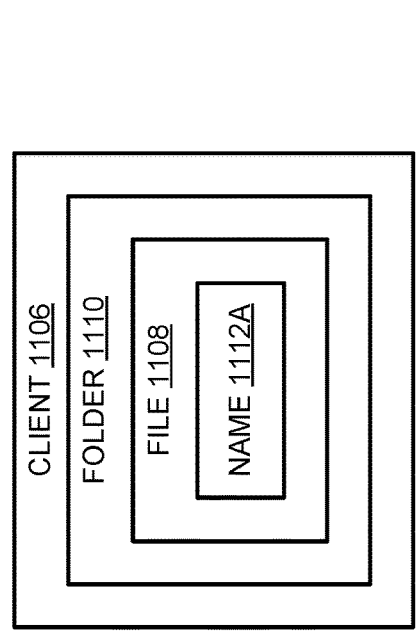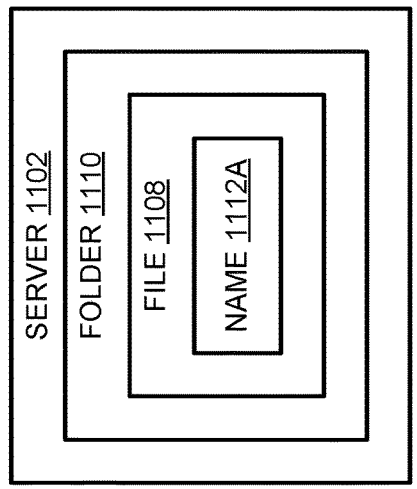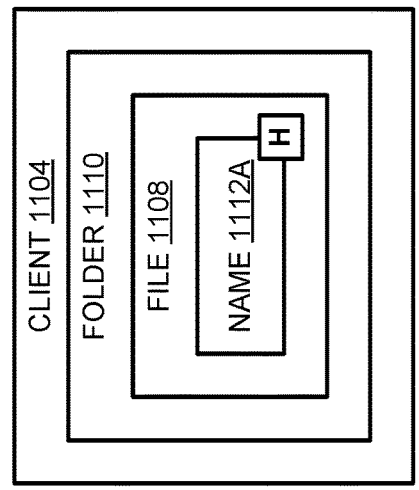
FIG. 11B

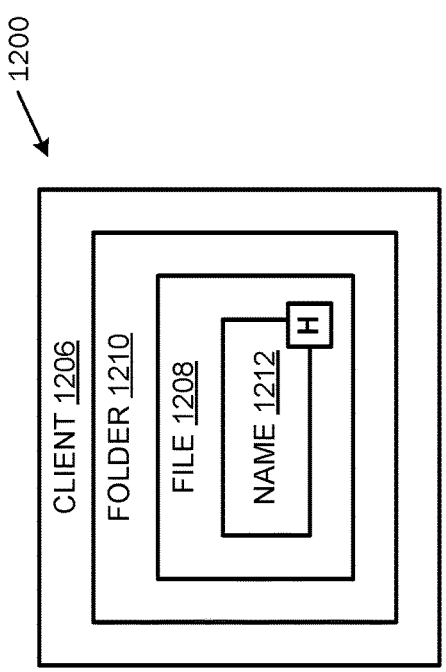
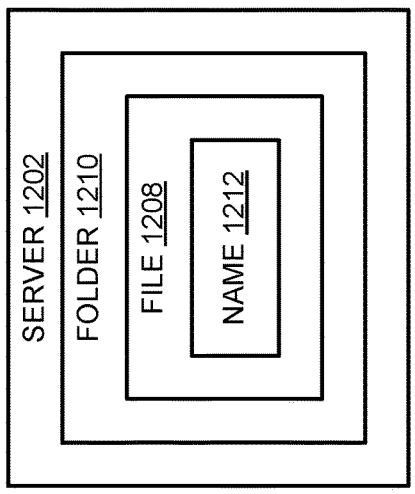
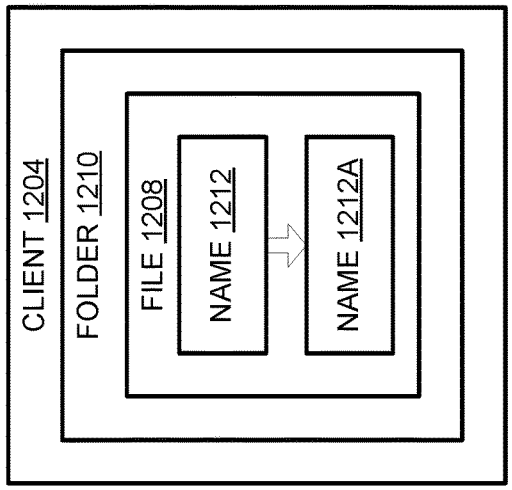
FIG. 12A
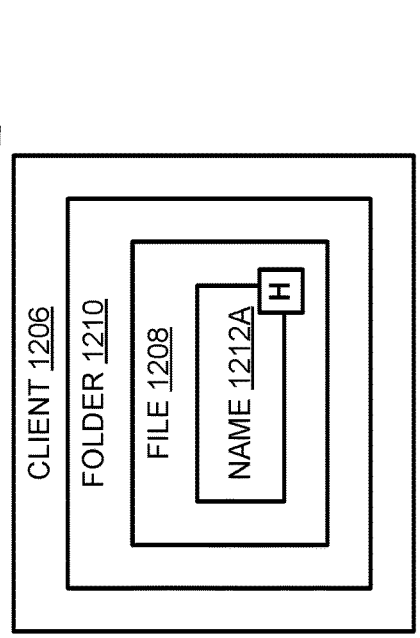
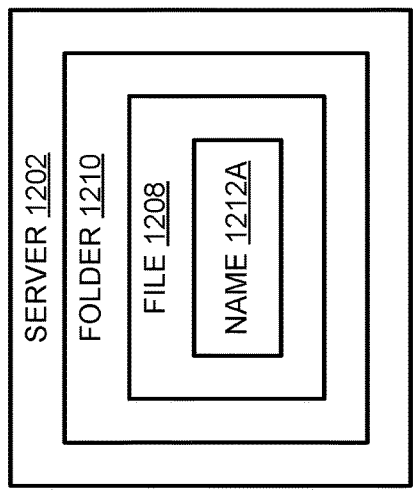
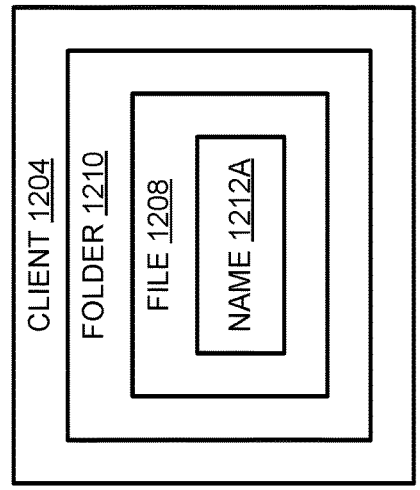
FIG. 12B

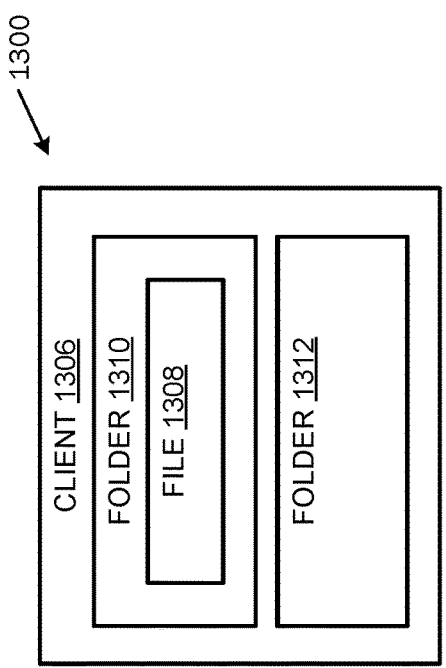
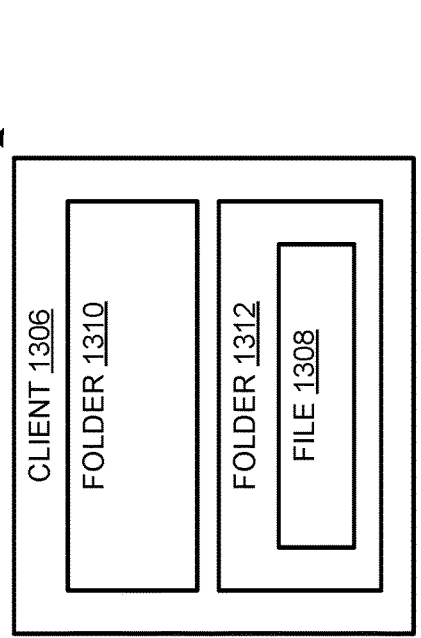
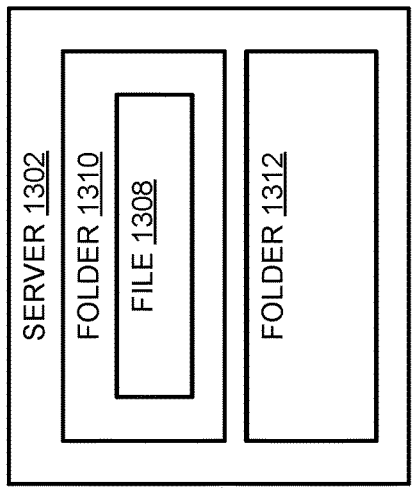
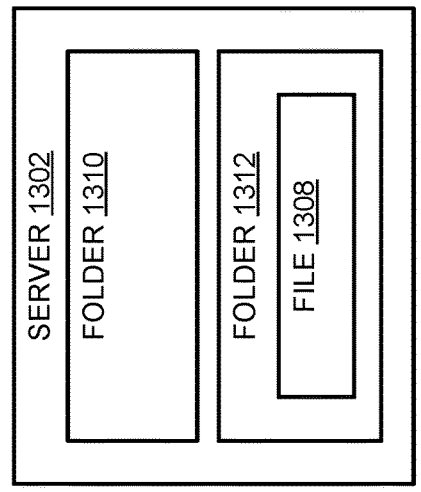
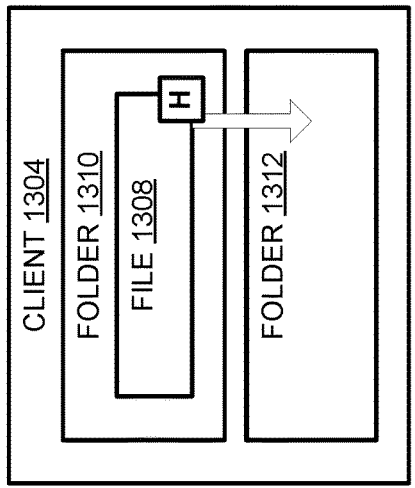
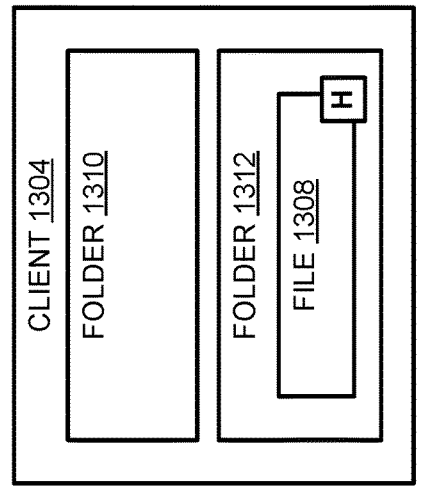
FIG. 13A
FIG. 13B

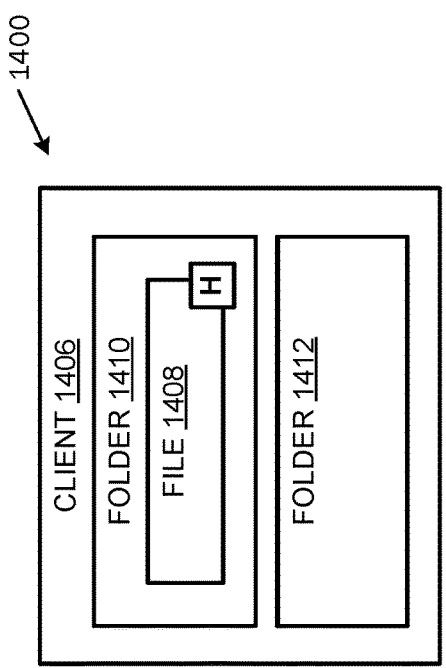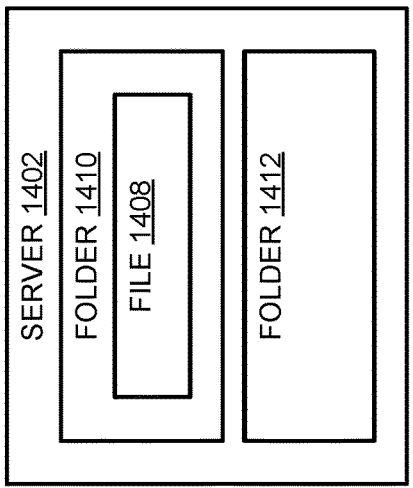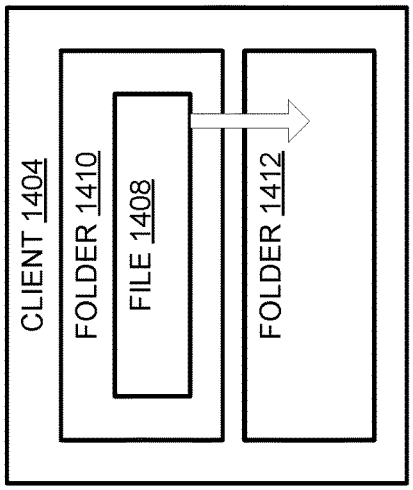
FIG. 14A
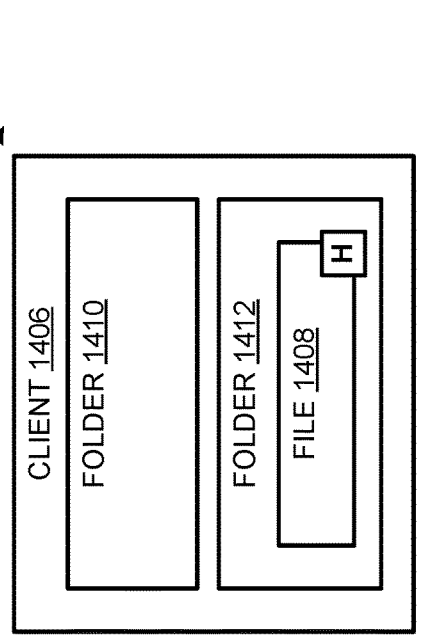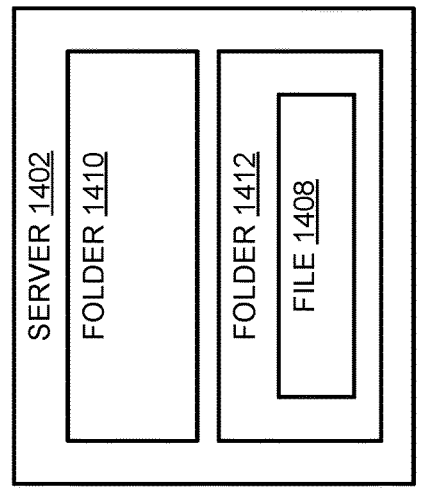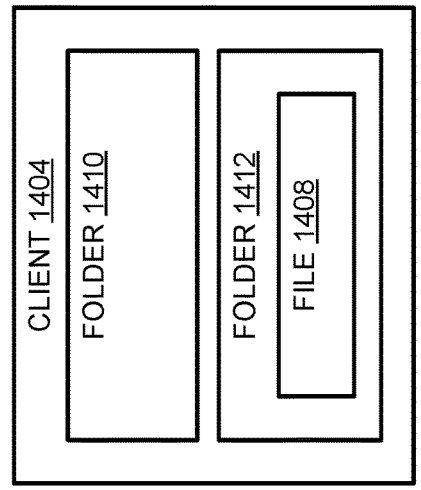
FIG. 14B

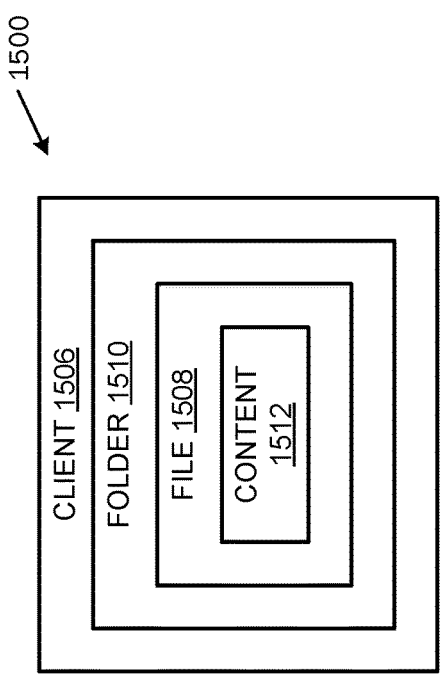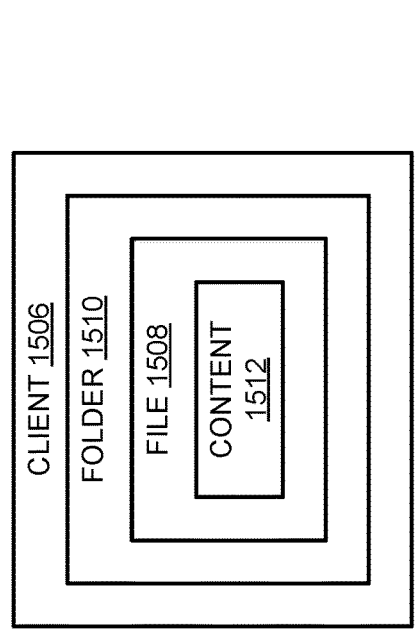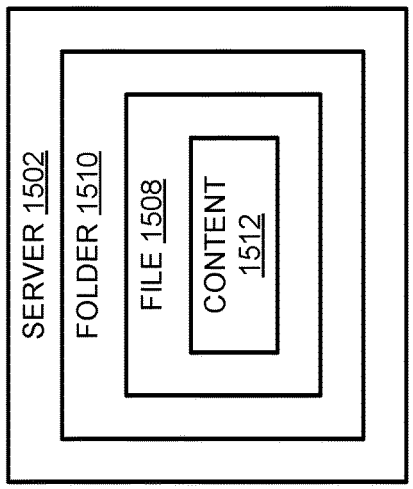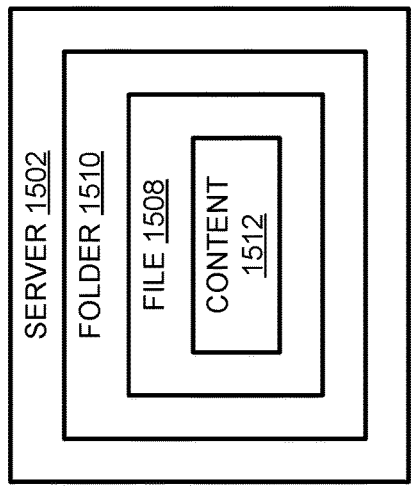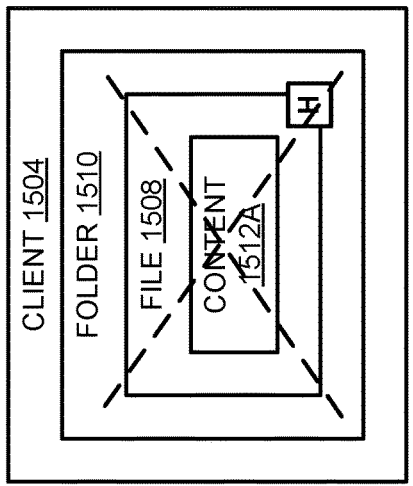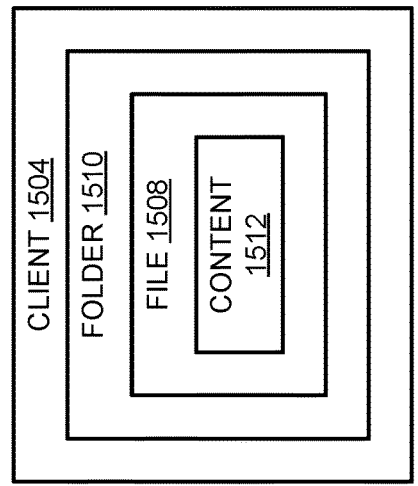
FIG. 15A
FIG. 15B

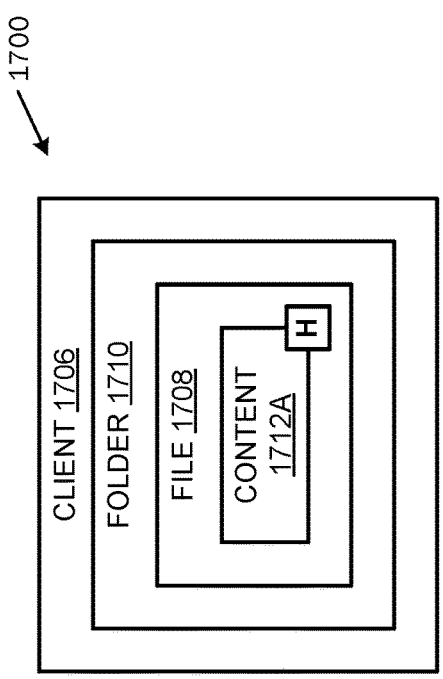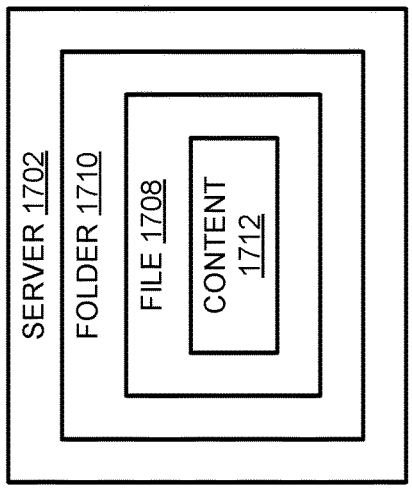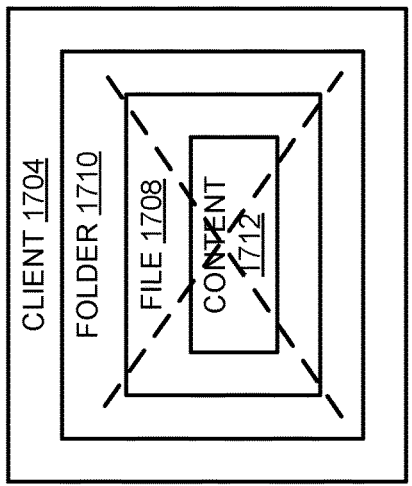
FIG. 17A
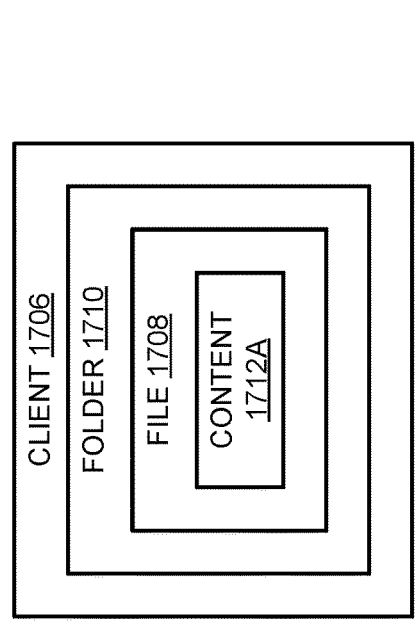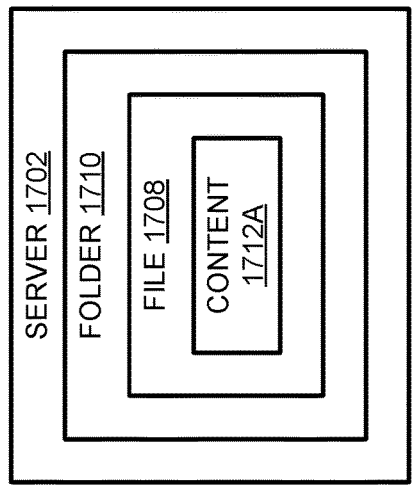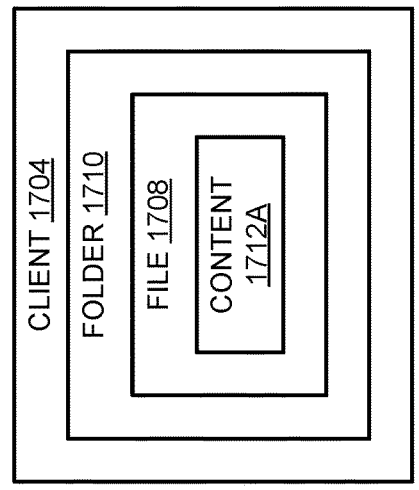
FIG. 17B

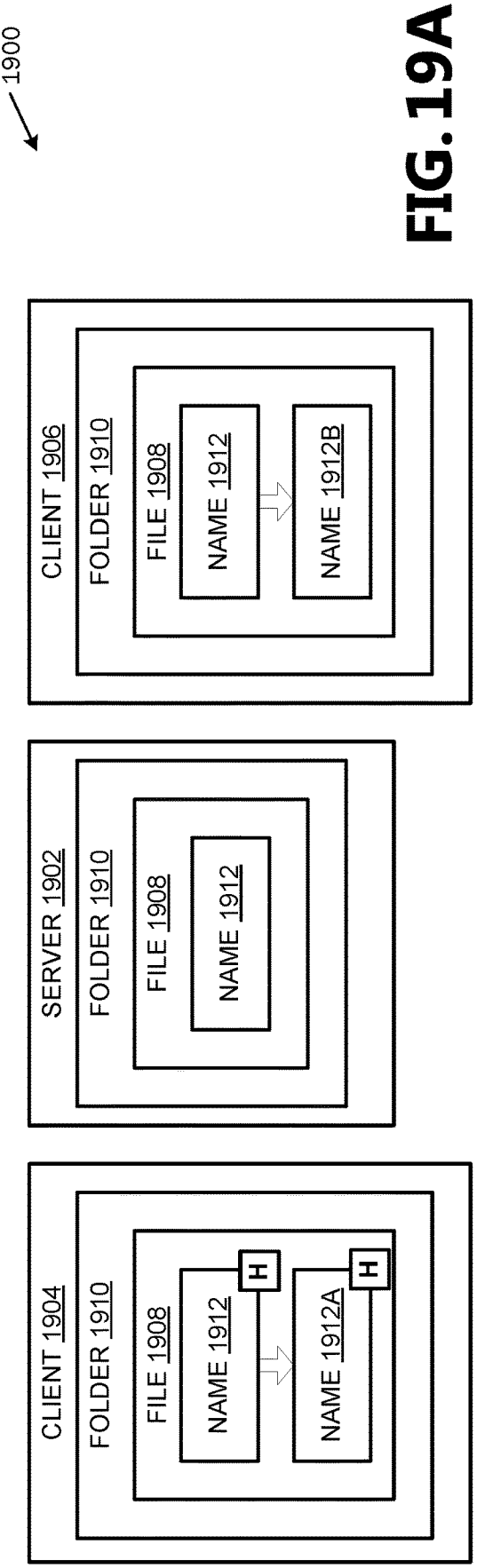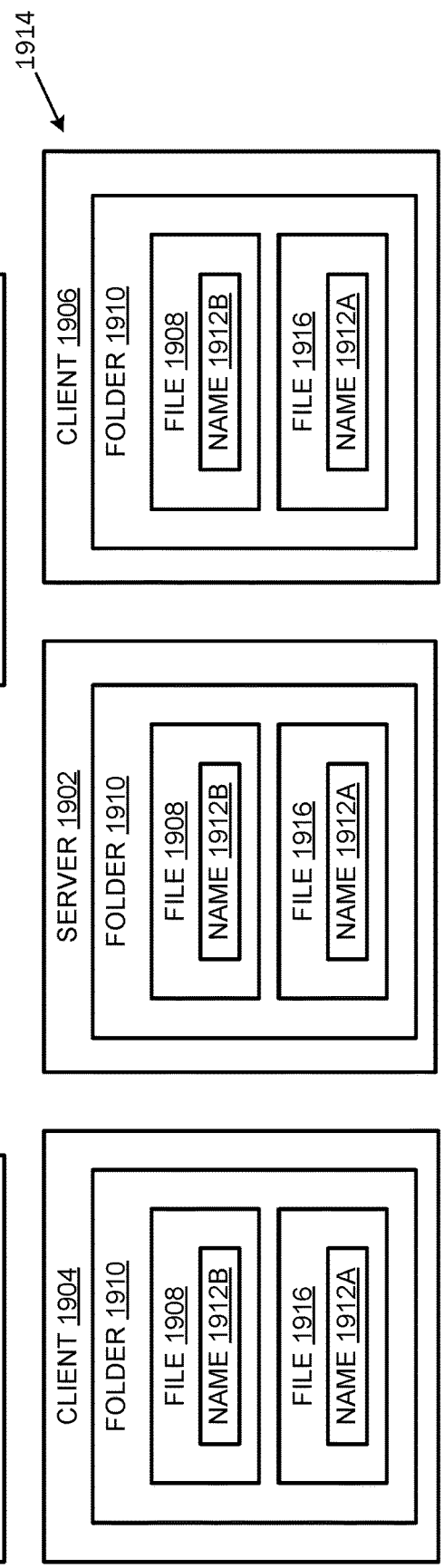

FILE SYNCHRONIZATION PAUSING FOR INDIVIDUAL FILES

CROSS-REFERENCE TO RELATED APPLICATIONS

This application claims priority to U.S. Provisional Application Ser. No. 62/308,738, entitled "FILE SYNCHRONIZATION PAUSING FOR INDIVIDUAL FILES," filed on Mar. 15, 2016, the entire disclosure of which is hereby incorporated herein by reference.

BACKGROUND

Network-based storage services store files on a computing device that is available via a network. Non-limiting examples of network-based storage services include OneDrive from Microsoft Corporation of Redmond, Wash., Google Drive from Google Inc. of Mountain View, Calif., Box from Box Inc. of Los Altos, Calif., Dropbox from DropBox, Inc. of San Francisco, Calif., and Syncplicity from Syncplicity LLC of Santa Clara, Calif. Depending on the use, the files stored using the network-based storage services may be accessible to only a single user or to multiple users.

Network-based storage services also often synchronize files that are stored locally on a client computing device with files stored by the network-based storage services. For example, the network-based storage services may synchronize files located in one or more directories in a file system on the client computing device. After a file in the directory is edited by a user, the changes to the file are relayed to network-based storage services. Conversely, if a file that is being synchronized is changed in the network-based storage services (e.g., by another user having access to the file), those changes are relayed to the file on the client computing device.

When multiple users change the same file at the same time, synchronization may not be possible. Instead, the network-based storage service may "fork" the changed file, creating two copies of the files with different names and different contents. This forking of the file is often undesirable. Users typically do not want to have two copies of the file. And having two copies of the files prevents merging or other reconciliation of the conflict. Further, since there are two copies of the file, a user may access one of the copies without realizing the other copy exists.

It is with respect to these and other general considerations that aspects have been made. Also, although relatively specific problems have been discussed, it should be understood that the aspects should not be limited to solving the specific problems identified in the background.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

One aspect is a method for synchronizing files between a local file system and a server. The method includes accessing a file stored on the local file system for synchronization with an associated file on the server. The method also includes determining whether differences between the file and the associated file prevent synchronization of the file and the associated file. When determined that differences between the file and the associated file prevent synchronization of the file and the associated file, the method places the file in a hold state. The hold state pauses synchronization of the content in the file with the content of the associated file. In some examples, the method continues to synchronize topological changes to files that have been placed in the hold state and/or resumes synchronization after it is determined that the file is no longer different than the associated file.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

Non-limiting and non-exhaustive examples are described with reference to the following figures.

FIG. 4 includes an illustration of an example client holding a file based on detecting a conflict.

FIG. 5 includes an illustration of two example clients holding a file based on both clients detecting conflicts.

FIGS. 8A and 8B illustrate an edit being made to a file that is being held.

FIGS. 9A and 9B illustrate an edit being made to a file that is being held by another client.

FIGS. 11A and 11B illustrate a file that is being held by a client being renamed on the client.

FIGS. 12A and 12B illustrate a file that is being held by a client being renamed on another client.

FIGS. 13A and 13B illustrate a file that is being held by a client being moved from one folder to another.

FIGS. 14A and 14B illustrate a file that is being held by a client being moved from one folder to another on another client.

FIGS. 15A and 15B illustrate a scenario in which a file that is being held by a client is deleted.

FIGS. 17A and 17B illustrate a scenario in which a file that is being held by a client is deleted by another client.

FIGS. 19A and 19B illustrate a scenario in which a file that is being held by a client is renamed locally and remotely.

DETAILED DESCRIPTION

Figure 1:
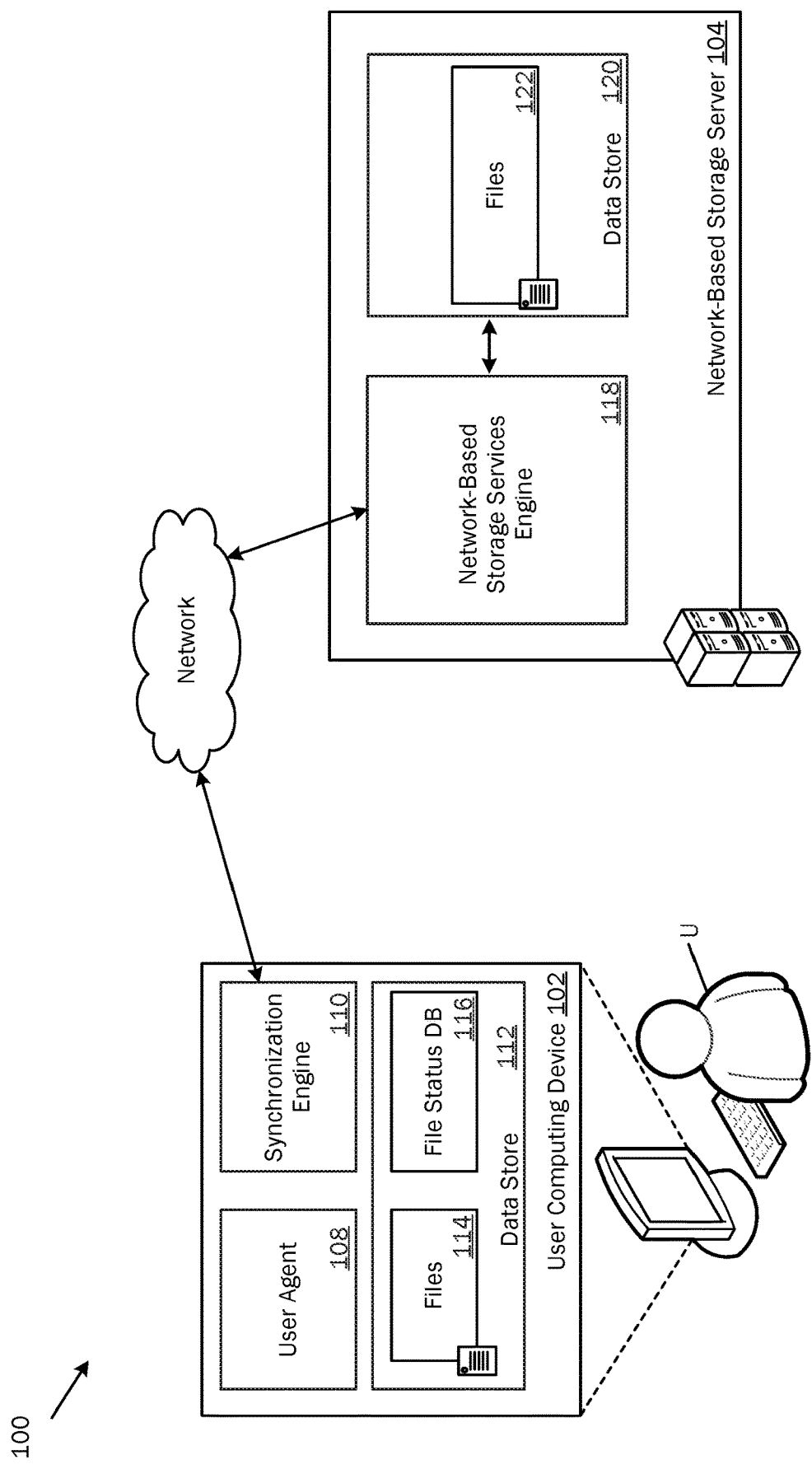
FIG. 1 is a simplified block diagram of an example of a system for providing network-based storage services.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

File synchronization is useful for many common activities. For example, co-authoring involves multiple users accessing a shared file from multiple computing devices to edit the file simultaneously. As users edit files, those edits need to be synchronized to the other users. Typically, the changes will be synchronized without the user closing and saving the file. However, if a user losses network access while co-authoring, the file the user is editing may become out-of-sync with the shared file. This may result in a conflict. Examples of file editors that provide co-authoring capabilities include document editors such as the WORD document editor from Microsoft Corporation of Redmond, Wash., spreadsheet editors such as the EXCEL® spreadsheet editor also from Microsoft Corporation, presentation editors such as the POWERPOINT® presentation editor also from Microsoft Corporation, and diagram editors such as the VISIO® diagramming editing software also from Microsoft Corporation.

A synchronization engine may set a file to a hold state in response to detecting a conflict. Setting the file to the hold state may be an alternative to forking the file. While the file is in a hold state, the synchronization engine can continue to synchronize other files. While the file is in the hold state, the synchronization engine will not synchronize changes to the content of the file (e.g., the updated content of the file will not be uploaded nor will changes to the contents of the file be downloaded from the network-based server), but the synchronization engine will continue to synchronize topological changes to the file. Examples of topological changes include renaming the file or moving the file to another directory in a file system.

The synchronization engine may also continue to synchronize at least some metadata changes to the file while the file is in the hold state. Additionally, the user may continue to modify the contents of the file while it is in the hold state. The file will leave the hold state and resume content synchronization when the conflict is resolved. The conflict may be resolved by the user merging the content (e.g., using a merge tool), choosing to overwrite the local or remote changes (i.e., the users selects to proceed with either the local or remote file), or choosing to fork the file into two files.

Files may also be placed in the hold state for other reasons such as when locally made changes cannot be synchronized due to a file being corrupted, a file name being too long, a file being encrypted, a file being too large, etc. In some aspects, synchronization of a file may be paused by placing the file in a hold state based on a user request (e.g., through a menu option on a user interface).

Often, the conflict can be resolved using an appropriate file editor. For example, if the file in a hold state is a document, a document editor may be able to analyze the changes to the local file and the remote file to determine whether to automatically merge the two files. An automatic merge can combine changes from multiple versions of a document that, for example, are in different regions of the document without requiring user input. Some document editors may not be able to automatically merge all types of changes, however. For example, if the same sentence has been changed in both conflict versions of a file, the document editor may be unable to determine which changes to the sentence to incorporate into the merged version of the file. In these situations, the document editor may present a user interface that guides the user in resolving the conflict.

FIG. 1 is a simplified block diagram of an example of a system 100 for providing network-based storage services. As illustrated in FIG. 1, the system 100 includes a user computing device 102 that is operable by a user U and a network-based storage server 104. The user computing device 102 and the network-based storage server 104 communicate over a network.

The user computing device 102 includes a user agent 108, a synchronization engine 110, and a data store 112. The user agent 108 allows the user to interact with files, such as the files 114 stored in the data store 112. In some embodiments, the user agent 108 is an application running on the user computing device 102. Additionally, the user agent 108 may be a component of an operating system running on the user computing device 102. In some examples, the user agent 108 is a browser application that generates interactive graphical user interfaces based on content received via the network. According to an example, an extension is installed on the user computing device 102 as a plug-in or add-on to the browser application (i.e., user agent 108) or is embedded in the browser application.

The data store 112 operates to store the files 114 and the file status database 116 as well as other data. The data store may comprise one or more file systems and databases such as relational databases. The files 114 may be organized into a hierarchical directory structure. The file status database 116 stores data about at least some of the files 114.

The synchronization engine 110 may be configured to synchronize all of the files 114. Alternatively, the synchronization engine 110 is configured to synchronize some of the files 114 such as the files stored in one or more of the directories in the data store 112. In some aspects, the synchronization engine comprises a scanner component and a realizer component. The scanner component scans files or directories in the data store 112 to identify files that have been changed and need to be uploaded to the network-based storage server 104. The realizer component communicates with the network-based storage server 104 to determine when files have been updated remotely and need to be downloaded from the network-based storage server 104.

The synchronization engine 110 stores information about the files 114 that it is configured to synchronize in the file status database 116. For example, the synchronization engine 110 may store a resource ID, a version value, one or more hash values, and a synchronization status for each file that has been synchronized from the network-based storage server 104.

The resource ID is used to identify the file and associate the file with a file stored by the network-based storage server 104. The version value indicates the version number of the file. The version value (sometimes referred to as an etag value) may be updated anytime the content or metadata of a file is changed. In some aspects, two hash values are stored: a server hash (sometimes referred to as the server hash in DB) and a local hash (sometimes referred to as the local hash in DB). The server hash stored in the file status database 116 is the most recent file hash value that the user computing device 102 received from the server. The local hash in the file status database 116 is the file hash value from when the file on the user computing device 102 was most recently synchronized with the network-based storage server 104.

Using the hash values, the synchronization engine 110 can determine if a locally stored file has changed after the last synchronization operation (e.g., by calculating a hash value for the corresponding locally stored file and comparing it to the local hash value in the file status database 116). The synchronization status indicates the current synchronization status of the file. For example, the synchronization status may indicate that synchronization is active for the file or that synchronization is on hold. In addition, the file status database 116 may also store other data related to the synchronization status such as a ServerFileIsNewer (or ServerFileisNewerThanLocalFile) flag to indicate a newer version of the file is available on the network-based storage server 104. In some aspects, the file status database also stores a hold reason and hold resolution field. Example values for the hold reason may include values that represent "Conflict," "MaxPath," and "Pause."

The network-based storage server 104 operates to provide network-based storage services to one or more computing devices such as the user computing device 102. As illustrated in FIG. 1, the network-based storage server 104 comprises a network-based storage services engine 118 and a data store 120. The network-based storage services engine 118 interacts with the synchronization engine 110 to provide access to files 122 in the data store 120 and information about the files so that the synchronization engine 110 may determine when synchronization is necessary.

If a file is edited locally and on the server without a synchronization occurring in between, an edit-edit conflict may occur. For example, this kind of edit-edit conflict can occur when multiple users edit the file at the same time from different client devices. This kind of edit-edit conflict can also occur when the same user edits the file from multiple computing devices. These edit-edit conflicts are more likely to occur when a user computing device is disconnected from the network for a period of time (e.g., when the user computing device is operating in an airplane mode). Examples of situations where edit-edit conflicts are generated are illustrated and described with respect to at least FIGS. 2-3.

The data store 120 stores files and other data and may comprise one or more file systems and databases such as relational databases. The data store 112 may comprise one or more server computing devices. In some aspects, the data store 112 may comprise a distributed database or a distributed file system.

As used herein a server may comprise one or more computing devices, including one or more server farms, which may be located anywhere, including in proximity to the user computing device 102 or distributed in various locations throughout the world.

The following steps occur during a local edit. The user edits the file and saves the changes (e.g., using the user agent 108). The synchronization engine 110 scans and uploads the local changes to the network-based storage server 104. An example method of scanning and uploading changes is illustrated and described with respect to at least FIG. 2. After the changes are uploaded, the synchronization engine 110 downloads updated metadata for the file from the network-based storage server 104 and stores it locally in the file status database 116. The metadata may include an updated version number for the file and an updated server hash value for the file.

The following steps occur to download a remote edit. The synchronization engine 110 downloads metadata from the network-based storage server 104 and stores the metadata in the file status database 116. The synchronization engine 110 then downloads the file content of files that were changed remotely to a temporary location. Then, the local files are replaced with the copies downloaded to the temporary location. An example method of downloading remote file edits and checking for potential conflicts is illustrated and described with respect to at least FIG. 3.

Figure 2:
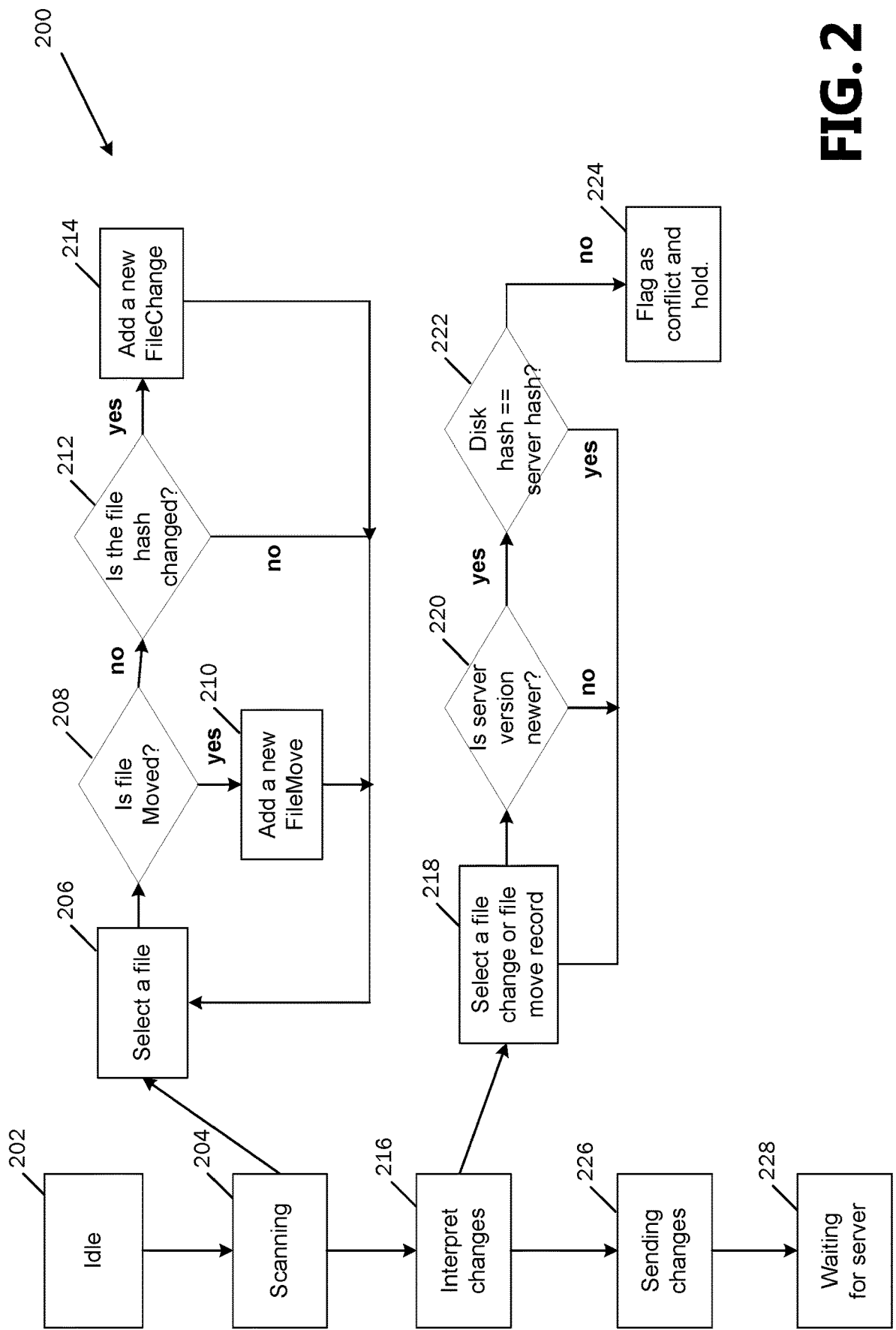
FIG. 2 illustrates a method for identifying potential conflicts prior to synchronizing local changes to a network-based file server.

FIG. 2 illustrates a method 200 for identifying potential conflicts prior to synchronizing local changes to a network-based file server. The method 200 may be executed by a component of a system such as the system 100. For example, the method 200 may be performed by the scanner component of the synchronization engine 110. The method 200 may be executed on a device comprising at least one processor configured to store and execute operations, programs, or instructions.

Initially, at operation 202, the synchronization engine idles until activated (e.g., based on a schedule, a detected change, a signal from a user or application, etc.). Then at operation 204, the synchronization engine scans local files for changes. During operation 204, some or all of the local files may be scanned.

At operation 206, a particular local file is selected. At operation 208, it is determined if the selected file has been moved. If so, the method proceeds to operation 210 where a file move record is created and stored (e.g., added to a table or queue of records requiring further processing for synchronization). If not, the method proceeds to operation 212.

At operation 212, it is determined whether the hash value for the file has changed (e.g., by calculating a new hash value for the file on the disk). If so, the method proceeds to operation 214, where a file change record is created and stored (e.g., added to a table or queue of records requiring further processing for synchronization). If not, the method proceeds to operation 206, where a new file may be selected for scanning. Similarly, after a file move or file change record is created, the method may return to operation 206 until all of the local files have been scanned.

After the files have been scanned, the method 200 continues to operation 216, where the changes are interpreted. In some aspects, changes and moves are interpreted in parallel with scanning files. At operation 218, a file change or file move record is selected for interpretation.

At operation 220, it is determined whether the server version of the file associated with the selected record is newer than the version of the file that was last synchronized from the server (e.g., by comparing the version number stored in the database to the version number on the server). If so, the method proceeds to operation 222, where it is determined whether the hash value for the local file matches the hash value for the file on the server. If not, the file is flagged as being in a conflict or pre-conflict and is put in a hold state at operation 224. In the hold state, further synchronization activities may be stopped or aborted to avoid unnecessary activities and preserve synchronization resources for other files. After a conflict/pre-conflict is detected, the method 200 may return to operation 218 to interpret additional records.

If instead, the hash values match at operation 222 or the server version is determined to not be newer at operation 220, the method returns to operation 218 where another record can be selected for interpretation.

At operation 226, changes that were detected during the scanning process are sent to the server. However, in some aspects, the changes are not sent to the server for files are in a hold state. At operation 228, the scanner waits for a response from the server indicating the changes have been received and accepted.

The method 200 may be performed while completing a full scan or a precise scan. A full scan processes all of the files and directories that the synchronization engine is configured to synchronize. A full scan may be performed for many reasons. In some aspects, a full scan is performed after a system reboot. A precise scan processes a subset of the files or directories that the synchronization engine is configured to synchronize. A precise scan may be performed for many reasons as well. As an example, a precise scan may be performed when a watcher component notices a change to a file (e.g., the file has been written, an edit timestamp has been updated, etc.).

Figure 3:
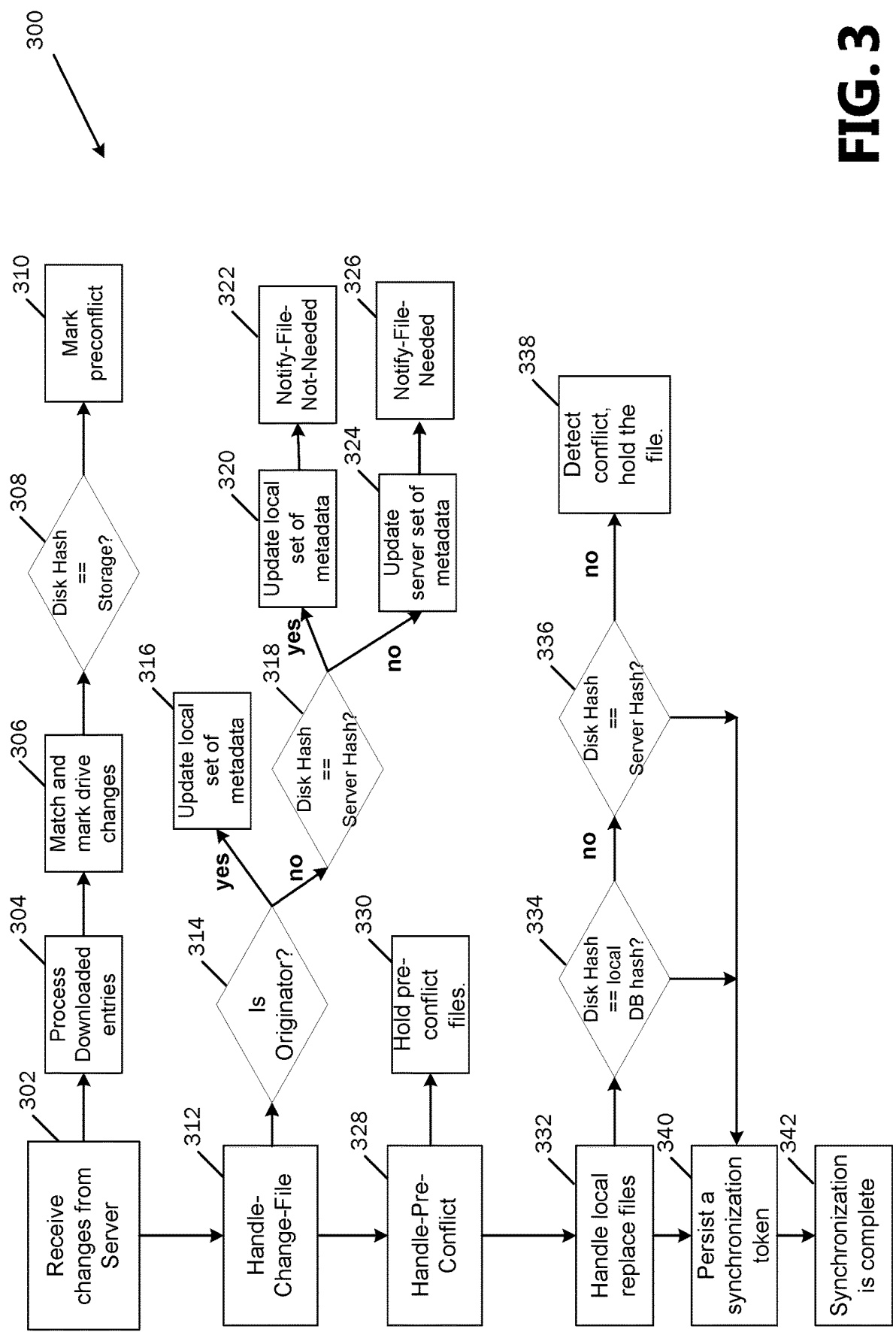
FIG. 3 illustrates a method for identifying potential conflicts prior to synchronizing remote changes from a network-based file server to a local file.

FIG. 3 illustrates a method 300 for identifying potential conflicts prior to synchronizing remote changes from a network-based file server to a local file. The method 300 may be executed by a component of a system such as the system 100. For example, the method 300 may be performed by the realizer component of the synchronization engine 110. The method 300 may be executed on a device comprising at least one processor configured to store and execute operations, programs, or instructions.

The synchronization engine 110 finds file changes by downloading data from the network-based storage server 104, handles the files changes, handles pre-conflicts, handles local file replacement, and stores (persists) synchronization tokens. During these steps a conflict or pre-conflict may be detected. The conflict or pre-conflict may be handled by putting the local file corresponding to the remotely edited file into a hold state. Although this figure illustrates the change as occurring remotely, usually the conflict/pre-conflict condition occurs because the file has been changed both locally and remotely without synchronization.

At operation 302, changes are received from the server. For example, the changes may be downloaded from the server. At operation 304, the received changes are processed. At operation 306, the changes are matched to local files and the local files are marked. At operation 308, it is determined whether the hash value for the local file matches the hash value on the server. If so, the method continues to operation 312. If not, the method continues to operation 310 where the file is marked as for pre-conflict handling.

At operation 312, the received file changes are handled. At 314, it is determined whether the user computing device performing the method 300 is the originator of the change. If so, the method proceeds to operation 316, where the local metadata is updated. If not, the method proceeds to operation 318.

At operation 318, it is determined whether the hash value for the file on disk matches the hash value for the file on the server. If so, the method proceeds to operation 320, where the local metadata is updated. And then the method proceeds to operation 322, where the server is notified that the file is not needed.

If instead, it is determined at operation 318 that the hash value for the file on disk does not match the hash value for the file on the server, the method proceeds to operation 324, where the server set of metadata is updated. And then the method proceeds to operation 326, where the server is notified that the file is needed.

At operation 328, pre-conflicts are handled. In some aspects, operation 328 handles each of the files that were marked as pre-conflict during operation 310. At operation 330, the files are put into the hold state as has been described previously.

At operation 332, the replace file operations are handled. In some aspects, a replace file operation is performed for each file in which the server was notified of in operation 326. The needed replacement files may be downloaded to a temporary directory initially. Thereafter, the method proceeds to operation 334, where the hash value for the file on disk is compared to the hash value stored in the database. If they are the same, it indicates that the content of the local file has not been changed since the last synchronization and the method can proceed to operation 340.

If the hashes do not match, the method proceeds to operation 336, where the hash value for the local file is compared to the server hash value in the database (corresponding to the last hash the client heard about from the server). If the hashes match, the contents of the files are the same and the method can proceed to operation 340.

If not, the method proceeds to operation 338 where a conflict is detected. When this conflict is detected, the file may be placed in a hold state as has been described previously. The method then proceeds to operation 340.

At operation 340, a synchronization token is persisted. In some aspects, the synchronization token is persisted by being stored in the data store 112. The synchronization token may include an indicator of the most recently occurring change that has been synchronized to the user computing device. Using the synchronization token, the network-based storage server may be able to identify changes that have occurred since the user computing device last synchronized. Afterwards, the method proceeds to operation 342 where the synchronization operation is completed.

In both of the processes illustrated in FIGS. 2 and 3, the conflicts/pre-conflicts are detected and confirmed by comparing hash values with previously stored hash values for files. For example, at the time of synchronization, the hash value of the local file will match the hash value of the file on the server. This matching hash value is stored in the file status database 116. Afterwards, if the local file is changed, its hash value will also change. The hash value will then no longer match the hash value in the file status database 116. Typically, the local file changes can be uploaded to synchronize the content on the network-based storage server 104. Similarly, if the file is changed remotely, the hash value of the remote file will no longer match the hash value stored in the file status database 116 (until another synchronization is completed). Typically, the remote file changes can be downloaded to synchronize the content from the network-based storage server 104 to the user computing device 102.

If the hash value stored in the file status database 116 matches neither the hash value for the local file nor the hash value for the remote file, both files have been changed without an intervening synchronization. In this case, uploading the local file or downloading the remote file to synchronize the files is undesirable because doing so would overwrite either the local or remote changes. This situation can be described as an edit-edit conflict. Upon detecting an edit-edit conflict for the file, the synchronization engine 110 holds the file. When the file is held, the synchronization engine neither uploads the local changes to the file to the network-based storage server 104 nor downloads the remote changes to the file from the network-based storage server 104. However, the synchronization engine 110 may continue to synchronize changes that do not affect the hash values. For example, if the local file is renamed, the synchronization engine 110 may cause the associated remote file to be renamed as well.

Some non-limiting examples of generating or detecting conflicts are described below.

In an example, metadata changes are downloaded and are persisted by the realizer component of the synchronization engine 110 before the scanner component of the synchronization engine 110 picks up a local edit. The scanner component catches the conflict, finding that the file is changed locally. Before uploading the file change, the synchronization engine 110 checks if the local file version is lagging behind the version on the network-based storage server. If so and the hash does not match the server hash in the database, then the upload is aborted. The file may then be placed in a hold state.

In another example, a file is changed locally before the realizer component of the synchronization engine 110 downloads and stores a change to that file from the network-based storage server 104. The realizer component may apply the metadata change to the local file. However, the scanner component of the synchronization engine 110 may pick up the change and catch the conflict, potentially placing the file in a hold state.

In another example, a local edit is made (e.g., using the user agent 108) before the synchronization engine 110 downloads updated metadata from the network-based storage server 104. When the file is changed on the network-based storage server 104 and the synchronization engine 110 gets the new change, before it updates the metadata from the server, the synchronization engine checks if there is a local change to the same file. If so, and the hash value for the local file differs from the hash value for the file on the network-based storage server 104, a conflict may be detected. The file may then be placed in the hold state.

In another example that is similar to the previous example, a local edit is made before downloading new metadata from the network-based storage server 104. In this example, the scanner component of the synchronization engine tries to upload the file change, and receives a failure response from the server because the server already has a newer version. Based on this conflict, the local file may be placed in a hold state. In another example, a conflict is identified after the synchronization engine 110 finishes downloading an updated file from the network-based storage server 104 but before it replaces the local copy (e.g., the changes have been downloaded to a temporary location). The realizer component of the synchronization engine 110 catches the conflict. Before overwriting the local file, the realizer component checks the hash value for the local file against the local hash value stored in the file status database 116 and a hash value calculated from the file in the network-based storage server 104. If neither matches, a conflict is detected and the local file is placed in a hold state.

Although most of the examples herein relate to edit-edit conflicts, aspects can be applied to other types of conflicts as well. For example, similar conflicts can be caused by conflicts occurring before a newly created file is fully synchronized (e.g., a create-create or pre-seed conflict). These conflicts may be addressed similarly to the edit-edit conflicts described herein. Files may also be held for other reasons besides detection of a conflict. For example, a user may expressly choose to hold synchronization of a file that is large when high-speed network access is unavailable. In this manner, other smaller files may continue to synchronize without the delay that may be required to transfer the large file.

FIG. 4 includes an illustration 400 of an example of a client holding a file based on detecting a conflict. In this illustration, a file 408 in a folder 410 that is stored and synchronized by a server 402 (e.g., the network-based storage server 104) is edited by first client 404 and a second client 406 without synchronization between the clients. For example, the first client 404 may be the user computing device 102, while the second client 406 may be a second similar computing device that is used by the same or a different user. In this example, the first client 404 modified the content of the file 408 to generate content 412A, while the second client 406 modified the content of the file to generate content 412B.

In this example, the synchronization engine of the first client 404 cannot merge the content 412A of the file 408 on the first client 404 with the content 412B of the file 408 on the server 402. So, the synchronization engine of the first client 404 holds the file 408 (indicated by the H icon). The hold state is local to the first client 404, so the server 402 and the second client 406 can remain synchronized with respect to the file 408. In contrast, if a forking model were used, each of the first client 404, the second client 406, and the server 402 would have two separate files (one with the content 412A and one with the content 412B).

FIG. 5 includes an illustration 500 of two example clients holding a file based on both clients detecting conflicts. In this illustration, a file 508 in a folder 510 that is stored and synchronized by a server 502 (e.g., the network-based storage server 104) is edited by a first client 504 and a second client 506 without synchronization between the clients. For example, the first client 504 may be the user computing device 102, while the second client 506 may be a second similar computing device that is used by the same or a different user. In this example, the first client 504 modified the content of the file 508 to generate content 512A, while the second client 506 modified the content of the file 508 to generate the content 512B. In this example, neither the first client 504 nor the second client 506 is able to synchronize their respective files with the server (e.g., because a third client (not shown) also edited the file). So both the first client 504 and the second client 506 have independently held their respective files. Although in this example the content 512A of the file 508 on the first client 504 is shown as being different than the content 512B of the file 508 on the second client 506, it is also possible for both clients to hold the file even if the content on the files on the two clients is the same. The conflict is evaluated against the server 502 as it stores the ground truth for all clients.

In some aspects, the hold state is maintained locally at the client computing device. The hold state can be maintained without the server 502 having any knowledge that a file is in a hold state on one or more of the client computing devices. A conflicted file being held on one of the clients does not prevent other clients from syncing with the server. However, the content changes on the client with the hold file will not be sent to the server, and thus will not be synchronized to other clients (and potentially put those other clients into a conflict as well).

In some aspects, there is no data loss on the client or server. Content changes made locally on a client are preserved until the conflict is resolved. Even if the local file is in a conflict state, the user can continue to edit and save the file. However, the content changes will not be uploaded to the server. The file on the server can continue to be updated from other clients, but those changes will not be downloaded to the client. Later when the user resolves the conflict, the user can choose to merge, keep only the local copy, only the server, or both of copies.

In some aspects, the presence of one or more conflicts will not prevent the synchronization engine from otherwise performing normally. The synchronization engine will detect the conflict and either keep the conflict (e.g., by placing the file in the hold state) and then move on, or resolve the conflict if that is possible. During future scans, the synchronization engine can check the file status database to determine whether any of the files being scanned are currently being held. If a file is being held, the synchronization engine may proceed with synchronization of topological changes and at least some metadata changes for the metadata file but will not synchronize the content of the file (e.g., the synchronization engine will not contact the network-based storage server 104 to upload or download content updates). Beneficially, the synchronization engine will not keep attempting to process content changes in the held file. In this manner, the synchronization engine may continue processing of other changes in other files.

In some aspects, topology changes are synced while a file is in the hold state. The synchronization engine continues to synchronize topology changes like rename/move/delete operations that have been performed either locally or remotely. When a scan is performed, the synchronization engine may continue to analyze held files for topological changes or changes to metadata associated with the file. If any topologic or metadata changes are detected, the synchronization engine may upload those changes to the network-based file server. Similarly, if the synchronization engine receives topological or metadata changes from the network-based file server, it may apply those changes to a held file.

In some aspects, an indicator of the hold state is stored in the file status database 116. A conflict can be detected by comparing hash values, but calculating and comparing the hash values may be computationally expensive. Beneficially, by storing an indicator of the hold state, the calculation can often be avoided and the process of scanning local files can be sped up.

Some aspects include telemetry tools to track and report on the files, including the files that are in the hold state. An example report may include a separate category to track the number of files in the hold state. The reports may additionally include information about how many files enter the hold state, how files exit the hold state, how many files exit the hold state, how long files are in the hold state, how many conflict files are moved/renamed, and how many conflict files are deleted.

Additionally, some aspects include an auditor tool that compares locally stored files to remote files on a regular basis (e.g., daily) to verify the synchronization process is correctly synchronizing files. In these embodiments, the auditor will ignore held files as the hash files will generally be different between the server and the local copy.

To maintain the relationship between the files, when the local file is in conflict, the resource ID of the file is not changed. Instead, the resource ID remains the same so that the synchronization can continue to associate the local file with the file on the server using the resource ID. When a file is being held, a flag in file status database 116 may be set to true to indicate that the server file is newer than the local file (e.g., a ServerFileIsNewerThanLocalFile flag). Because the file is out of sync and in conflict now, the server file must be ahead of the local file.

To allow continued synchronization of metadata related to the file, the version (etag) value stored in the file status database 116 is kept up to date with the server as are at least some other properties of the file such as modification time, size, and hash value. In this manner, even though the file is in a hold state and the synchronization engine 110 does not synchronize the content of the file, the synchronization engine 110 still synchronizes the metadata of the file. Since the server file is newer than the local file, the set of the server properties in the file status database 116 is now used to store the properties that the client received from the network-based storage server 104. In some aspects, other types of metadata are synchronized as well. For example, metadata maintained and used by applications to support co-authoring may be synchronized as well.

When there is a conflict, the hash value calculated for the locally stored file will be different than the server hash value stored in the file status database 116. Since the local file content must be different from the storage file content and the server hash value stored in the file status database 116 continues to be synchronized with the hash value for the file stored remotely on the network-based storage server 104, these hash values will not match.

In some aspects, when the synchronization engine 110 restarts, the scanner component will scan all files under the root folder, including all the existing held files. The synchronization engine will perform a process similar to that performed when uploading files and the conflict will be confirmed and the hold state maintained.

Figure 6A:
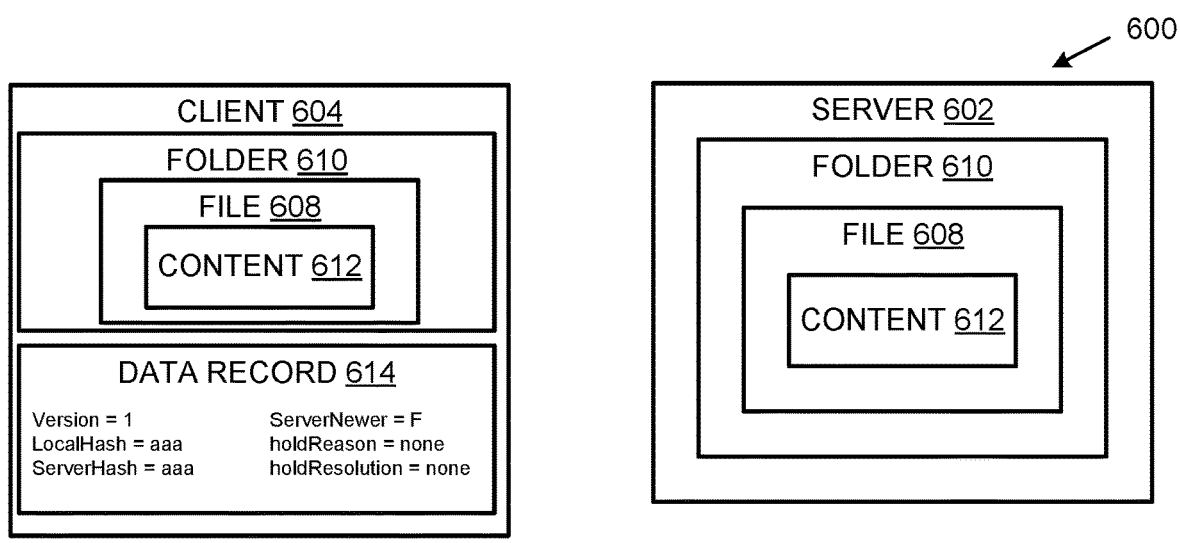
FIGS. 6A-6C illustrate a scenario in which a synchronization engine places a file in the hold state FIG. 7 includes an illustration of an example resolution to the conflict illustrated in FIG. 6.
Figure 6B:
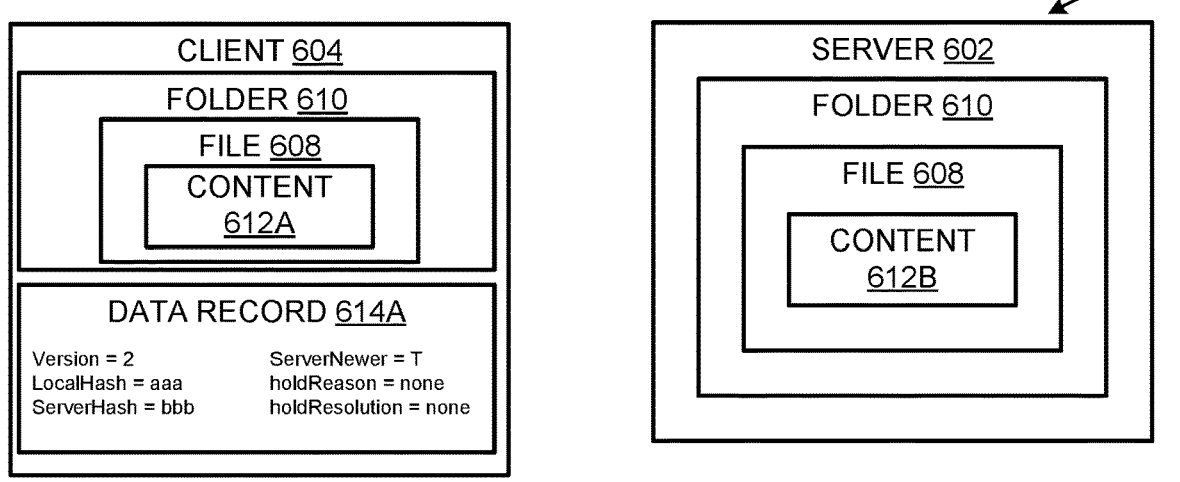
Figure 6C:
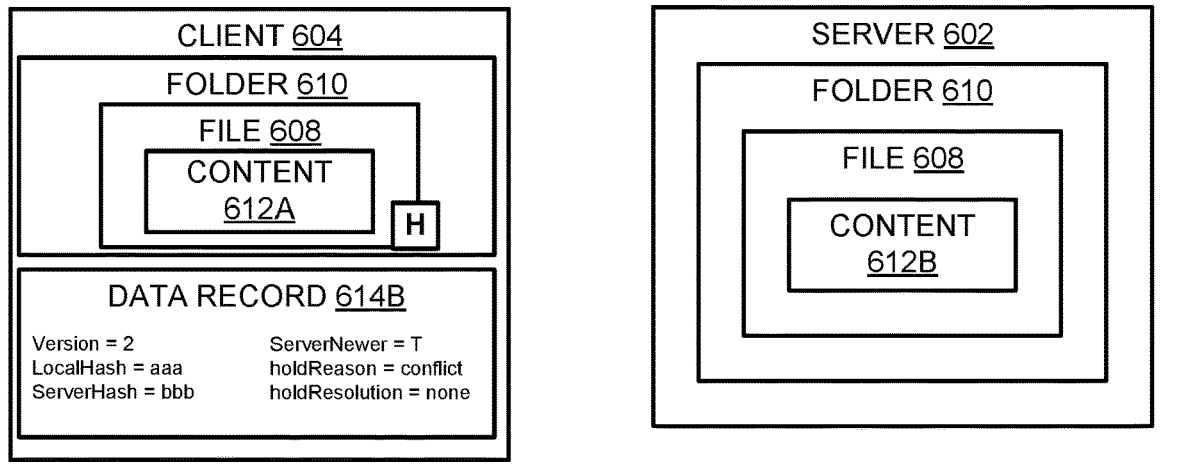

FIGS. 6A-6C illustrate a scenario in which a synchronization engine places a file in the hold state. The initial status of the file is shown at 600. A file 608 in a folder 610 on the client 604 having content 612 is in sync with the file 608 on the server 602. Example data values for the file 608 that are stored in the file status database 116 are shown in a data record 614, which is associated with the file 608. The version (or etag value) is 1, the local hash value matches the server hash value, the ServerNewer flag is false, and the file is not being held.

At 616, the client 604 goes offline and a user makes changes to the file 608, generating content 612A. Because the client 604 is offline, the synchronization engine is unable to synchronize the file 608 because it cannot access the server 602. While the client 604 is offline, the file 608 is changed from somewhere else as well, generating the content 612B. When the client 604 goes back online, the metadata from the server is brought down by the realizer component of the synchronization engine. Example data values for the file 608 that are stored in the file status database 116 are shown as updated in data record 614A. The version is now set to 2 as a new version of the file 608 is available on the server 602. The ServerHash value is now updated based on the changed content 612B on the server 602. The LocalHash value remains unchanged as the Local-Hash value reflects the hash value from when the client 604 and the server 602 were last synchronized. Additionally, the ServerNewer flag is set to true as the server 602 has a newer version (2) than the version that was used to synchronize with the client 604.

At 618, after the realizer component of the synchronization engine brings down the metadata changes from the server 602, the realizer identifies the conflict (e.g., by determining that the hash value calculated from the content 612A does not match the LocalHash stored in the database). The synchronization engine then updates the database as shown in data record 614B to store the conflict status as the hold reason. In some aspects, the synchronization engine also stores a timestamp associated with the hold status.

FIG. 7 includes an illustration 700 of an example resolution to the conflict illustrated in FIG. 6. As shown in illustration 700, after resolution, both the client 604 and the server 602 include a version (3) of the file 608 with content 612C. Additionally, the file 608 on the client 604 is no longer being held, the LocalHash and the ServerHash are both equal to 'ccc', and ServerNewer is set to False. There are multiple ways the conflict could be resolved. For example, the user can open the file 608 using a file editor such as the user agent 108 that includes a merge tool. The user may open the file 608 after noticing that the file 608 is in a hold status or for another reason. The file editor may automatically process the content 612A (see FIG. 6C) of the file 608 on the client 604 and the content 612B of the file 608 on the server 602 to generate the content 612C that resolves the conflict.

Depending on the file editor and the nature of the content changes, the file editor may also prompt the user to resolve the conflict (e.g., by presenting a user interface to indicate how to resolve the conflict). Once resolved, the file editor may upload the content 612C to the server 602 and indicate that the conflict has been resolved (e.g., by making an appropriate API call to the synchronization engine). The synchronization engine may then update the metadata in the data record 614B in the file status database 116 and clear the hold state. In some aspects, the synchronization engine clears the hold status immediately. Alternatively, the synchronization engine does not clear the conflict immediately. Instead, the synchronization engine places the file in an intermediate state; the sync status is "syncing," and the hold resolution is "merge." The file may remain in this state, for example, until the metadata has been synchronized.

Another way the conflict could be resolved is the user could choose to fork the file (e.g., by selecting a fork option from a user interface). In this case, the content 612A from the file 608 on the client 604 will be uploaded to the server 602 as a separate file with a different name and different resource ID. Thereafter, two separate files will exist on both the server 602 and the client 604.

In some aspects, holds are cleared when it is determined that the content of the file 608 on the server 602 and the content of the file 608 on the client 604 are the same. For example, the files may have been independently edited to come back in sync (or a user may have independently downloaded the server content). If the scanner component of the synchronization engine detects this situation (e.g., that the hashes match), the hold status will be cleared. In some situations, the scanner component may not be able to fully determine that the file 608 is in sync. In these situations, the scanner component may upload the content from the file 608 on the client 604 and if the network-based storage services engine accepts the changes, the hold will be cleared. Another way a hold can be cleared is when the realizer downloads the content from the file 608 on the server 602 (or the hash for the content of the file 608 on the server 602) and determines that the hash now matches the hash of the content of the file 608 on the client 604. In this case, the hold can be cleared as the file 608 on the client 604 is no longer in conflict with the file 608 on the server 602.

FIGS. 8A and 8B illustrate an edit being made to a file that is being held. FIG. 8A includes illustration 800, which shows the pre-edit state of the file. A server 802, a client 804, and a client 806 all store a file 808 in a folder 810. The file 808 is synchronized between the server 802 and the client 806, which both store the content 812. The file 808 is being held by the client 804 and has content 812A that is out of sync with the server 802.

Although the file 808 is being held on the client 804, a user can continue to perform normal operations on the file (e.g., the user may edit, rename (move), or delete) both locally and remotely. Typically, for both the scanner component (local changes) and the realizer component (remote changes), non-content changes (e.g., rename, move, delete) are synchronized as usual, while content changes are dropped (e.g., not synchronized), unless the content change resynchronizes the file (i.e., changing the content of one of the files so that the hashes match).

FIG. 8B includes illustration 814, which shows the post-edit state of the file. For example, a user of client 804 may edit the file 808 to generate the content 812B even though the file 808 is being held by the client 804. In this situation, the hold state remains and the file 808 on the server 802 and on the client 806 are unaffected. In this case, when the scanner component of the synchronization engine detects the change in content of the file 808 on client 804 (e.g., based on timestamp updates or file size changes), the scanner component determines that the file 808 is in the hold state and that the changes do not resolve the conflict (e.g., by comparing the hash value calculated for the content 812A to the local hash value in the database) and drops the change (i.e., does not upload the changes to the server).

FIGS. 9A and 9B illustrate an edit being made to a file that is being held by another client. FIG. 9A includes illustration 900, which shows the pre-edit state of the file. In this example, a server 902, a client 904, and a client 906 all store a file 908 in a folder 910. The file 908 is synchronized between the server 802 and the client 804, which both store the content 812. The file 808 is being held by the client 806 and has content 812A, which is out of sync with the server 802 and has caused the client 806 to place the file 808 in a hold status.

FIG. 9B includes illustration 914, which shows the post-edit state of the file 908. The file 908 is edited on the client 904 to generate the content 912B. This change does not create a conflict between the client 904 and the server 902, so the content changes are uploaded from client 904 to the server 902. In the meantime, the content 912A of the file 908 on the client 906 is unaffected and the file 908 remains in the hold state on the client 906.

Figure 10:
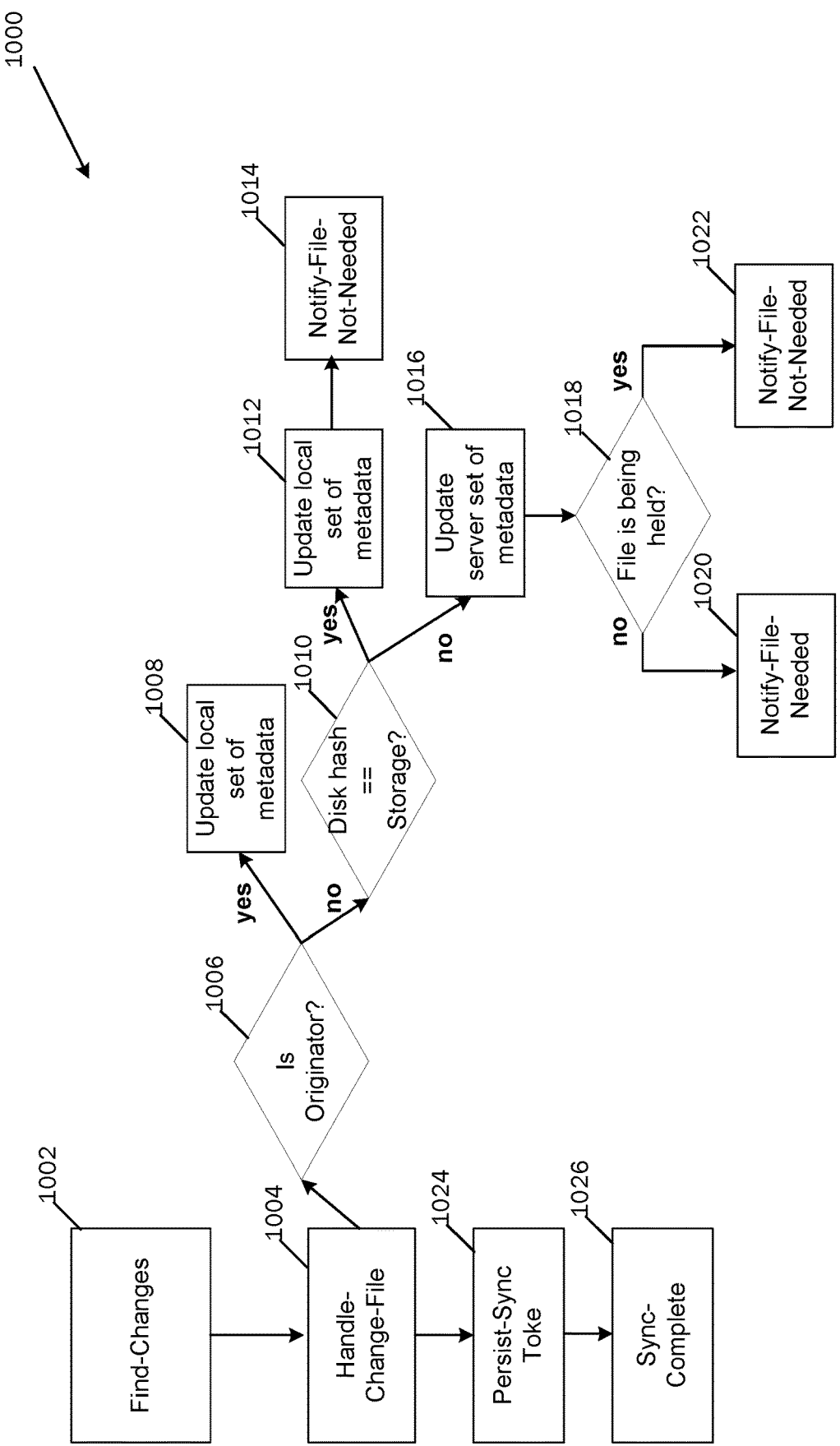
FIG. 10 illustrates a method performed by some aspects of the realizer component of the synchronization engine processing a remote edit of a held file.

FIG. 10 illustrates a method 1000 performed by some aspects of the realizer component of the synchronization engine processing a remote edit of a file that is being held. In some aspects, the method 1000 is similar to the method 300, illustrated in FIG. 3. In some aspects, the method 1000 includes fewer, different, or additional steps. Additionally, the steps of the method 1000 may be performed in a different order than that shown in FIG. 10.

At operation 1002, the synchronization engine 110 finds file changes. The file changes may be found similarly to operations 302-310 of the method 300. At operation 1004, the file changes are handled. At 1006, it is determined whether the user computing device performing the method 1000 is the originator of the change. If so, the method proceeds to operation 1008, where the local metadata is updated. If not, the method proceeds to operation 1010.

At operation 1010, it is determined whether the hash value for the file on disk matches the hash value for the file on the server. If so, the method proceeds to operation 1012, where the local metadata is updated. And then the method proceeds to operation 1014, where the server is notified that the file is not needed.

If instead, it is determined at operation 1010 that the hash value for the file on disk does not match the hash value for the file on the server, the method proceeds to operation 1016, where the server set of metadata is updated. And then the method proceeds to operation 1018, where it is determined whether the file is being held on client. If not, the method proceeds to operation 1020, where the server is notified that the file is needed. Otherwise, the method proceeds to operation 1022, where the server is notified that the file is not needed.

At operation 1024, a synchronization token is persisted. In some aspects, the operation 1024 is similar to operation 340. Afterwards, the method proceeds to operation 1026 where the synchronization operation is completed.

FIGS. 11A and 11B illustrate a file that is being held by a client being renamed on the client. FIG. 11A includes an illustration 1100, which shows the file being renamed from name 1112 to name 1112A. In this example, a server 1102, a client 1104, and a client 1106 all store a file 1108 in a folder 1110. The file 1108 is synchronized between the server 1102 and the client 1106, but the file 1108 is being held by the client 1104 (e.g., the content of the file may be different on the client 1104 than the content on the server 1102).

FIG. 11B includes an illustration 1114 after the file 1108 has been renamed on the client 1104. After the file 1108 is renamed to the name 1112A on the client 1104, the name 1112A is synchronized to the server 1102 and then to the client 1106 via the server 1102. As shown, the file 1108 ends up renamed to the name 1112A on both the server 1102 and the client 1106 even though the file 1108 is being held on the client 1104. Even after the file 1108 is renamed, the file 1108 remains in the hold state on the client 1104. In other words, the content (not shown) of file 1108 is not synchronized between the client 1104 and the server 1102.

FIGS. 12A and 12B illustrate a file that is being held by a client being renamed on another client. FIG. 12A includes an illustration 1200, which shows the file 1208 being renamed from name 1212 to name 1212A. In this example, a server 1202, a client 1204, and a client 1206 all store a file 1208 in a folder 1210. The file 1208 is synchronized between the server 1202 and the client 1204, but the file 1208 is being held by the client 1206 (e.g., the content of the file 1208 may be different on the client 1206 than the content on the server 1202).

FIG. 12B includes an illustration 1214 after the file 1208 has been renamed on the client 1204. After the file 1208 is renamed to the name 1212A on the client 1204, the name 1212A is synchronized to the server 1202 and then to the client 1206 via the server 1202. As shown, the file 1208 ends up renamed to the name 1212A on the client 1206 even though the file 1208 is being held on the client 1204. Even after the file 1208 is renamed, the file 1208 remains in the hold state on the client 1206. In other words, the content (not shown) of file 1208 is not synchronized between the client 1206 and the server 1202 even though the name is synchronized.

For example, the realizer component of the synchronization engine of the client 1206 may detect the change to the name metadata of file 1208 on the server 1202 and then download the new name to synchronize the metadata. However, the content of the file 1208 from the server 1202 is not downloaded to the client 1206, nor is the content of the file 1208 on the client 1206 uploaded to the server 1202. Instead, the file 1208 remains in the hold status on the client 1206.

FIGS. 13A and 13B illustrate a file that is being held by a client being moved from one folder to another. FIG. 13A includes an illustration 1300 of a server 1302, a client 1304, and a client 1306 that all store a file 1308 in a folder 1310. The client 1304 has the file 1308 in a hold status (e.g., the content of the file 1308 may be different on the client 1304 than the content on the server 1302), while the file 1308 is not being held on the client 1306. Additionally, the file 1308 is being moved from the folder 1310 to a folder 1312 on the client 1304.

FIG. 13B includes an illustration 1314 after the file 1308 has been moved from the folder 1310 to the folder 1312 on the client 1304. The move is uploaded to the server 1302, which then synchronizes the move to the client 1306. However, the content from of the file 1308 on the client 1304 is not uploaded and the file remains in the hold status. In this example, the scanner component of the synchronization engine running on the client 1304 determines that the metadata associated with the file 1308 has been modified to indicate a new parent folder and that this change can be uploaded to the server 1302 while the file 1308 is held on the client 1304 (e.g., without resolving the conflict).

FIGS. 14A and 14B illustrate a file that is being held by a client being moved from one folder to another on another client. FIGS. 14A and 14B illustrate a scenario that is similar to the scenario illustrated in FIGS. 13A and 13B except that the file is moved on a client that is not holding the file.

FIG. 14A includes an illustration 1400 of a server 1402, a client 1404, and a client 1406 that all store a file 1408 in a folder 1410. The client 1406 has the file 1408 in a hold status (e.g., the content of the file 1408 may be different on the client 1404 than the content on the server 1402), while the file 1408 is not being held on the client 1404. Additionally, the file 1408 is being moved from the folder 1410 to a folder 1412 on the client 1404.

FIG. 14B includes an illustration 1414 after the file 1408 has been moved from the folder 1410 to the folder 1412 on the client 1404. The move is uploaded to the server 1402, which then synchronizes the move to the client 1406. The realizer component of the synchronization engine of the client 1406 detects the change to the metadata on the server and downloads the new folder location to synchronize the metadata. However, the hold status is not resolved on the client 1406 (e.g., the content of the file 1408 from the server is not downloaded to client 1406, nor is the content of the file 1408 on the client 1406 uploaded to the server). Instead, the file remains in the hold status.

FIGS. 15A and 15B illustrate a scenario in which a file that is being held by a client is deleted. FIG. 15A includes an illustration 1500 of a server 1502, a client 1504, and a client 1506 that all store a file 1508 in a folder 1510. The client 1504 has the file 1508 in a hold status (e.g., the content 1512A of the file 1508 on the client 1504 is different than the content 1512 of the file 1508 on the server 1502), while the file 1508 is not being held on the client 1506. As shown in FIG. 15A, the file 1508 is deleted on the client 1504

FIG. 15B includes an illustration 1514 after the file 1508 has been deleted on client 1504. After the file 1508 is deleted on the client 1504, the synchronization engine of the client 1504 downloads the file 1508 with the content 1512 from the server 1502 to recreate the file 1508 on the client 1504. After being recreated on the client 1504, the file 1508 has the content 1512, which matches the server 1502. Accordingly, there is no longer a conflict and the file 1508 is no longer in the hold state on the client 1504.

Figure 16:
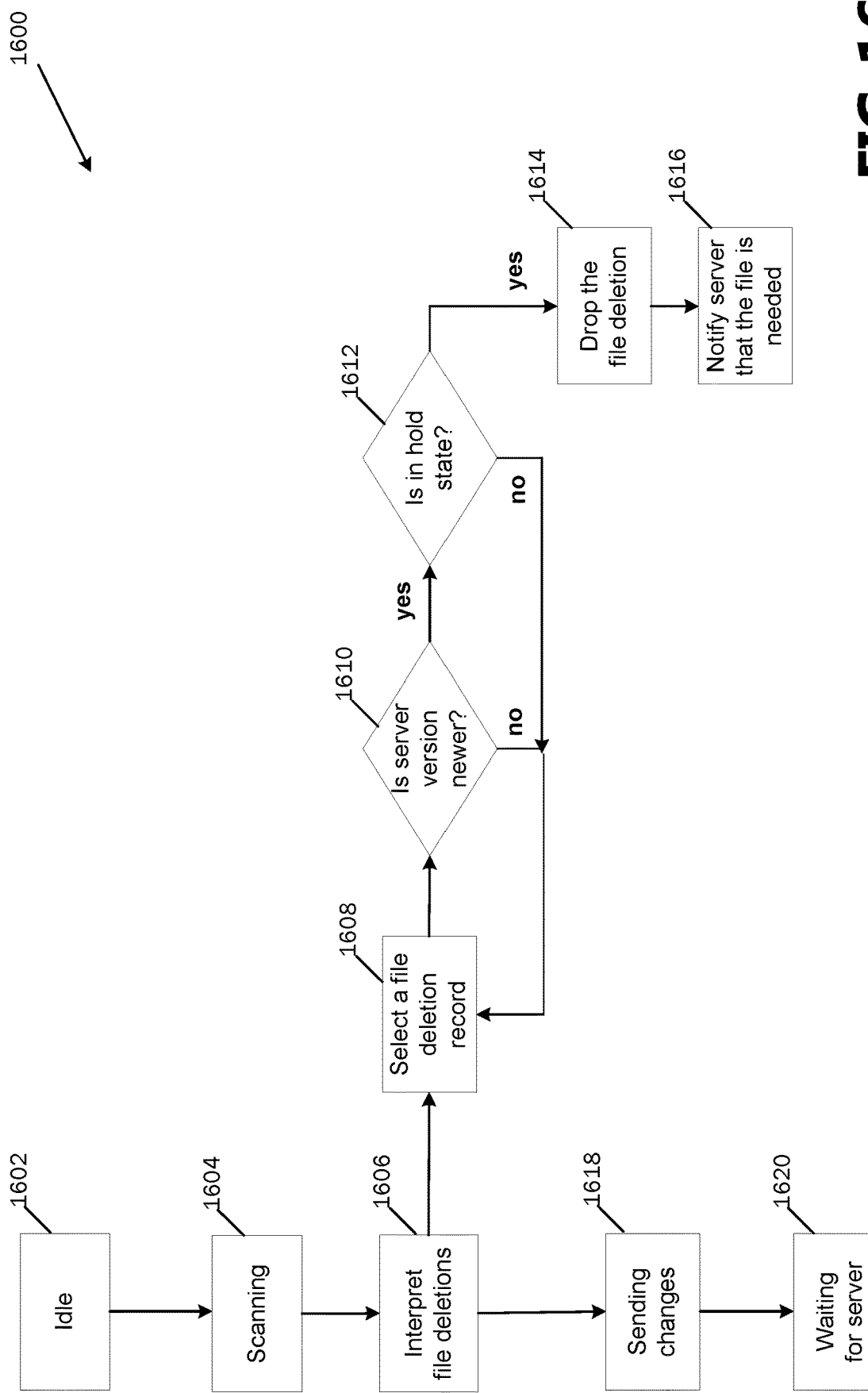
FIG. 16 illustrates a method performed by some aspects of the scanner component of the synchronization engine processing a local delete of a held file.

FIG. 16 illustrates a method 1600 performed by some aspects of the scanner component of the synchronization engine processing a local delete of a file that is being held. At least some of the operations the method 1600 may be similar to the method 200, illustrated in FIG. 2. In some aspects, the method 1600 includes fewer, different, or additional steps. Additionally, the steps of the method 1600 may be performed in a different order than that shown in FIG. 16.

Initially, at operation 1602, the synchronization engine idles until activated (e.g., based on a schedule, a detected change, a signal from a user or application, etc.). Then at operation 1604, the synchronization engine scans local files for changes. Operation 1604 may be similar to operations 204-214, which are illustrated and described with respect to at least FIG. 2.

At operation 1606, file deletions are interpreted. Operation 1606 may be performed on a subset of the changes detected during scanning in 1604 (namely, the subset of changes that include a deletion). Other changes detected by the scanning process may be handled by other methods described herein.

At operation 1608, a file deletion record is selected for interpretation. At operation 1610, it is determined whether the server version of the file associated with the selected record is newer than the version of the file that was last synchronized from the server (e.g., by comparing the version number stored in the database to the version number on the server). If so, the method proceeds to operation 1612, where it is determined whether the file being deleted is in a hold state. If so, the method proceeds to operation 1614 where the file deletion record is dropped (e.g., marked complete without transmission to the server). Thereafter, at operation 1614, a request is sent to the server for the file (e.g., the copy of the file as it exists on the server). After a delete record is interpreted, the method 200 may return to operation 1608 to interpret additional records.

FIGS. 17A and 17B illustrate a scenario in which a file that is being held by a client is deleted by another client. FIG. 17A includes an illustration 1700 of a server 1702, a client 1704, and a client 1706 that all store a file 1708 in a folder 1710. The client 1706 has the file 1708 in a hold status (e.g., the content 1712A of the file 1708 on the client 1706 is different than the content 1712 of the file 1708 on the server 1702), while the file 1708 is not being held on the client 1706. As shown in FIG. 17A, the file 1708 is deleted on the client 1704.

FIG. 17B includes an illustration 1714 after the file 1708 has been deleted on client 1704. After the file 1708 is deleted on the client 1704, the synchronization engine of the client 1704 transmits the deletion to the server 1702 where the file 1708 is also deleted. The deletion is not synchronized from the server 1702 to the client 1706 however, because the file 1708 is being held on the client 1706. Instead, the file 1708 with content 1712A is uploaded from the client 1706 to the server 1702. The conflict between the server 1702 and the client 1706 with regard to the file 1708 is resolved and the client 1706 removes the hold from file 1708. In some aspects, a new resource ID is assigned to the file 1708 and the server 1702 treats the newly uploaded file as new and unrelated to the deleted file.

Figure 18:
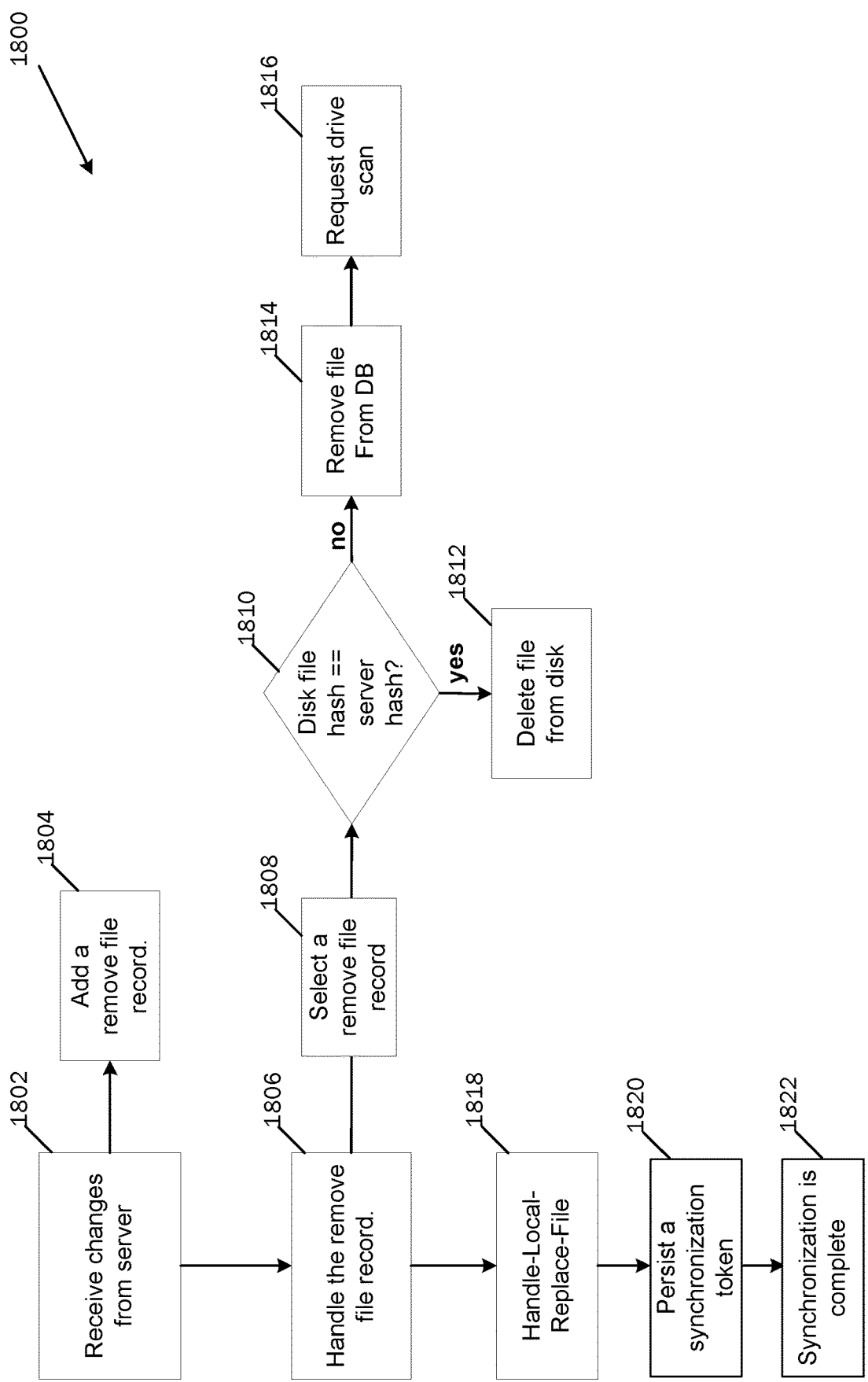
FIG. 18 illustrates a method performed by some aspects of the scanner component of the synchronization engine processing a held file that has been deleted remotely.

FIG. 18 illustrates a method 1800 performed by some aspects of the realizer component of the synchronization engine processing a delete of a file that is being held. At least some of the operations the method 1800 may be similar to the method 300, illustrated in FIG. 3. In some aspects, the method 1800 includes fewer, different, or additional steps. Additionally, the steps of the method 1800 may be performed in a different order than that shown in FIG. 18.

Initially, at operation 1802, changes are received from the server. Operation 1802 may be similar to operation 302. In some scenarios, operation 1802 will include operation 1804, in which a remove file record is added based on changes received from the server. For example, if a file is deleted remotely, the server may send changes to the realizer that result in creating a remove file record.

At operation 1806, remove file records are handled. In some aspects, operation 1806 is performed in parallel with operation 1802. At operation 1808, a remove file record is selected.

At operation 1810, it is determined whether the hash value for the file on disk matches the server hash value stored in the database. If so, the method proceeds to operation 1812, where the file is deleted from the disk.

If the hash values do not match at operation 1810, the method proceeds to operation 1814, where the file is removed from the database. The file remains on disk, however. Thereafter, the method proceeds to operation 1816, where a request is made to the scanner to re-scan the drive. Upon re-scanning, the scanner will discover the file and add the file to the database and the server as a new file.

At operation 1818, any local replace file operations are handled. Operation 1818 may be similar to previously described operations 332-338. At operation 1820, a synchronization token is persisted. At operation 1822, synchronization is complete. Operation 1820 may be similar to previously described operation 340. Afterwards, the method proceeds to operation 1822, where the synchronization operation is completed.

Other examples of operations that can affect a local file that is in a hold state include a folder rename, move, or change. In these scenarios, the local folder change will be detected by the scanner component of the synchronization engine, and because of the hash mismatch, the conflicted file will be considered as a file that has been changed on the local drive. Later, the synchronization engine will put the file into a hold state due to detecting a conflict and drop the drive change (i.e., not upload the new content to the server). This may be similar to the situation for a local file edit.

If the change is instead coming from server, after the remote change is processed (i.e., the folder is renamed, moved, or changed to match the server) and the synchronization completes, the scanner component will again pick up the disk change. Thus the conflicted file will be scanned, and once again the conflict will be detected and the content changes will not be uploaded to the server.

When a folder is deleted locally, each of the files within the folder will be deleted as well—even files that are being held. In this case, any files in a hold state are processed similarly to a file delete as illustrated and described with respect to at least FIGS. 15-16. Similarly, when a folder is deleted remotely, the realizer component will receive an indication to remove any held files within the folder. The held files will be processed similarly to the process illustrated and described with respect to at least FIGS. 17-18.

If a folder is unmapped (e.g., synchronization is disabled for the folder), the folder itself and all of its descendant folders are checked for existing holds. If any files are being held, the unmap action is rejected and the user will be notified with the reason. In some aspects, the user will need to resolve the hold conflict before the unmap action can be performed.

FIGS. 19A and 19B illustrate a scenario in which a file that is being held by a client is renamed locally and remotely (i.e., a rename-rename conflict). FIG. 19A includes an illustration 1900 of a server 1902, a client 1904, and a client 1906 that all store a file 1908 with a name 1912 in a folder 1910. The client 1906 has the file 1908 in a hold status (e.g., the content of the file 1908 on the client 1906 is different than the content of the file 1908 on the server 1902), while the file 1908 is not being held on the client 1906. As shown in FIG. 19A, the file 1908 is renamed to name 1912A on the client 1904 and renamed to name 1912B on the client 1906.

FIG. 19B includes an illustration 1914 after the file 1908 has been renamed on both the client 1904 and the client 1906. After the file 1908 is renamed on the client 1904 and the client 1906, the file 1908 is forked into a second file 1916 that has the name 1912A and the content from the held file 1908 on the client 1904. The file 1908 will have the name 1912B and will retain the content of the file 1908 on the server 1902 and the client 1906 before the renames. After the fork, both of the files will be stored on each of the server 1902, the client 1904, and the client 1906. The file 1908 is independent of and is not synchronized with the second file 1916.

Files that are co-authorable (such as files for any of the various applications of the OFFICE® productivity suite from Microsoft Corporation of Redmond, Wash.) may have some special attributes. If a co-authoring application is used to edit a co-authorable file, the co-authoring application will perform the synchronization while the file is open for editing. Additionally, the co-authoring application will create a synchronization lock (e.g., in the file status database 116) so that the synchronization engine does not try to synchronize the file while the file is open in a co-authoring application. When the file is closed, the synchronization lock will be removed and the synchronization engine will resume synchronizing the file. The co-authorable file may be associated with additional metadata that is used for synchronizing co-authoring changes during editing. For example, a separate hash value may be calculated by a co-authoring application during co-authoring activities (i.e., that does not require the changes be saved to disk). Similarly, the co-authoring application may generate and set a version number of the content that can be updated during a co-authoring session without writing the file to disk.

The applications in the Office productivity suite from Microsoft Corporation are examples of co-authoring application. As a non-limiting example, the Office applications calculate a hash value during co-authoring that is referred to as a Cobalt hash, and a version value during co-authoring that is referred to as a waterline. Other co-authoring applications may generate additional or different metadata for co-authoring. If additional metadata is available for co-authoring, the synchronization engine can also use that data to recognize differences between the server file and local file. Although some of the examples, figures, and timelines herein refer to Office and Cobalt hashes, the examples, figures, and timelines are applicable to other co-authoring applications as well.

When the co-authoring application is not running, the previously described local hash in the database will be used if it exists. If the file does not have a local hash in the database and only has a cobalt hash, the scanner component will calculate the local hash if the local file cobalt hash does not match either the server or local copy in the database. The realizer component will also calculate the disk file cobalt hash and compare it against the local copy in the database. If the hashes match, the file is determined to be up-to-date and the realizer component will store the hash file on disk in as the local hash in database.

When the co-authoring application is running, the co-authoring application will not upload the file when it is in a conflict state. The synchronization engine will not receive any indication about the file from either the co-authoring application (e.g., via a Component Object Model (COM) interface) or the server (via notifications). Also, the scanner component will skip the file when the file is locked by the co-authoring application. This means that the synchronization engine has no way to know that a file has become out-of-sync while the co-authoring application is running. Instead, the synchronization engine will need to detect the conflict after the user exits the co-authoring application and then the file can be moved to the hold state.

In some situations, the co-authoring application can clear the hold state. For example, if the co-authoring application successfully uploads changes to the server, the conflict may be determined to have been cleared. Additionally, if the co-authoring application merges downloaded content from the server successfully, the conflict is resolved. In some cases, the co-authoring application will transmit an indication to the synchronization engine that the hold has been cleared.

Additionally, if the server cobalt hash matches the local cobalt hash, the conflict is resolved implicitly. In an example timeline, a conflict in a held file is resolved using a co-authoring application. The co-authoring application uploads the changed file and saves the uploaded file. Then when find changes is next performed by the realizer, the hold is removed from the file as the hashes match.

Figure 20:
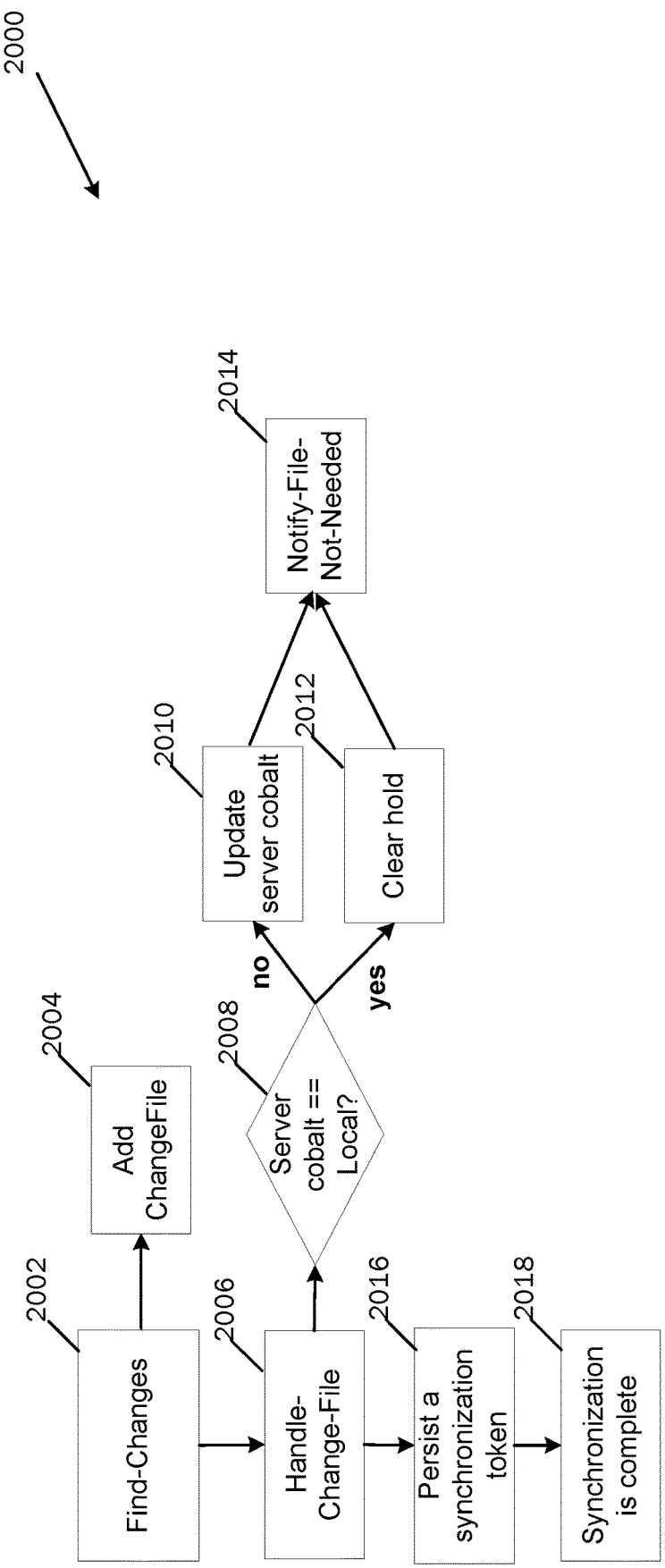
FIG. 20 illustrates a method performed by aspects of the scanner component when a file is edited using a co-authoring application.

FIG. 20 illustrates a method 2000 performed by some aspects of the realizer component of the synchronization engine processing a changes to a held file that has been edited in a co-authoring application. At least some of the operations the method 2000 may be similar to the method 300, illustrated in FIG. 3. In some aspects, the method 2000 includes fewer, different, or additional steps. Additionally, the steps of the method 2000 may be performed in a different order than that shown in FIG. 18.

Initially at operation 2002, the synchronization engine 110 finds file changes. The file changes may be found similarly to operations 302-310 of the method 300. At operation 2004, change file records are generated for changes that are received from the server.

At operation 2006, the file change records are handled. At operation 2008, it is determined whether the server cobalt hash matches the local cobalt hash. If not, the method proceeds to operation 2012 where the server cobalt hash is updated. If the hashes do match, the method proceeds to operation 2014 where the hold is cleared. Then at operation 2014, the server is notified that the file is not needed.

At operation 2016, a synchronization token is persisted. Operation 2016 may be similar to previously described operation 340. Afterwards, the method proceeds to operation 2018, where the synchronization operation is completed.

In another scenario relating to a conflict being resolved in a co-authoring application is described below. After the synchronization engine receives a SaveProperties call from the co-authoring application, the conflict resolution bit is set, but the file remains held. The file status will show as "syncing". The scanner component will pick up the file, and since the local cobalt hash matches the disk file cobalt hash, the synchronization engine will upload a non-content file change. The hold state will be cleared when the synchronization engine processes the ChangeFile change, since at that time the server cobalt hash matches the local cobalt hash.

Figure 21:
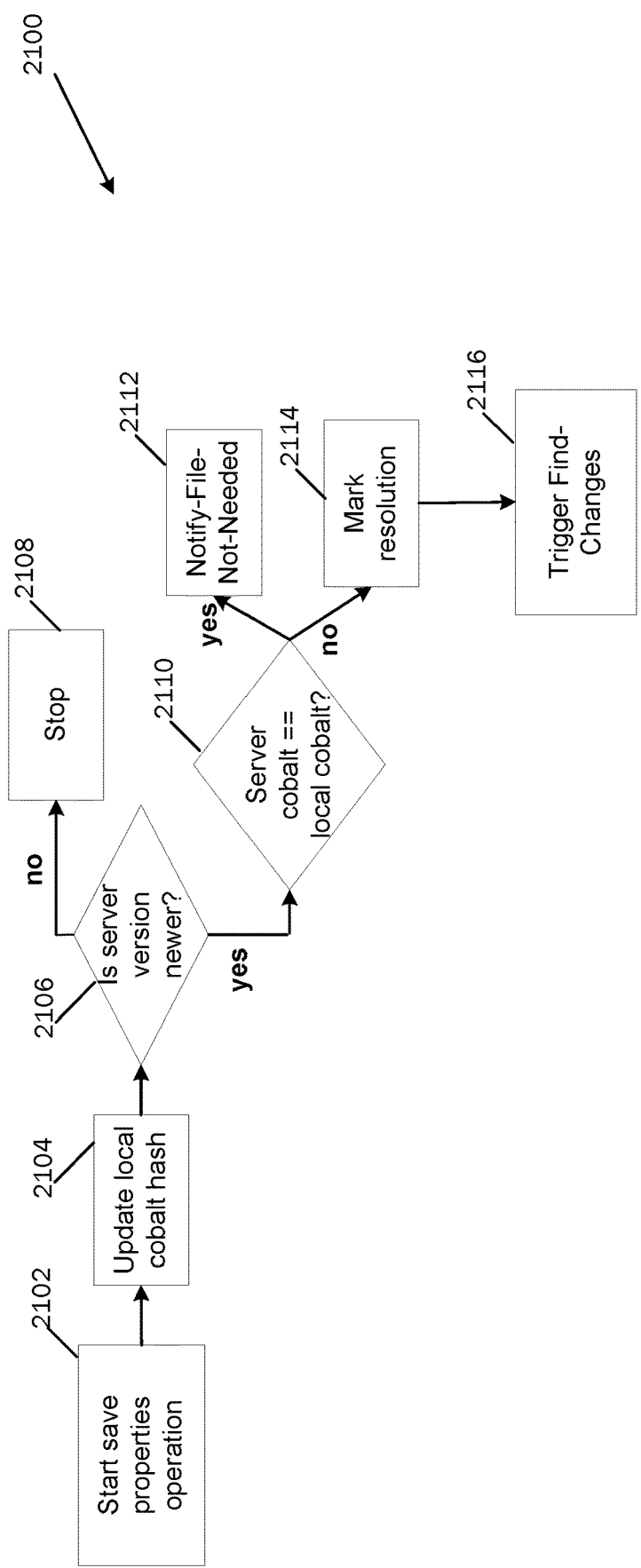
FIG. 21 illustrates a method performed by aspects of the scanner component when a file is edited using a co-authoring application.

FIG. 21 shows a method 2100 that may be performed by embodiments of the synchronization engine when a file is being edited using a co-authoring application. In some aspects, the method 2100 includes fewer, different, or additional steps. Additionally, the steps of the method 2100 may be performed in a different order than that shown in FIG. 21.

Initially at operation 2102, a save properties operation is started. The save properties may be started in response to a call from a co-authoring application to indicate that a conflict has been resolved in the co-authoring application. At operation 2104, the local cobalt hash is updated.

At operation 2106, it is determined whether the server version of the file associated with the selected record is newer than the version of the file that was last synchronized from the server (e.g., by comparing the version number stored in the database to the version number on the server). If not, the method ends at operation 2108. If so, the method proceeds to operation 2110, where the server cobalt hash is compared to the local cobalt hash.

If the server cobalt hash matches the local cobalt hash, the method proceeds to operation 2112, where the server is notified that the file is not needed. If not, the method proceeds to 2214, where the conflict is marked as resolved (even though the content of the files do not necessarily match yet).

At operation 2216, the find-changes operation is triggered. For example, the method 2000 may then be performed to finish the synchronization operation.

When a file is being edited with a co-authoring application, there are many different scenarios that can occur to synchronize the file. Some example scenarios are discussed below.

In one scenario, a conflict on a held file is resolved in a co-authoring application. The changes are uploaded by the co-authoring application to the server. The scanner component of the synchronization engine may run to identify that the file has changed locally. Since the file is being held, only metadata changes will be updated on the server by the synchronization engine. However, the hold state will be cleared when the scanner component determines that the server cobalt hash matches the disk file cobalt hash.

In another scenario, a conflict is resolved in the co-authoring application and the user continues to edit the file. After resolving the conflicts in the co-authoring application, the user continues to edit the file. However, there is a delay for the find change notifications, and the synchronization engine receives them only after the two SaveProperties calls from the co-authoring application. In this case, the conflict is cleared as soon as the first SaveProperties call is received and the synchronization engine will put the file in the deferred download queue.

When the first FindChanges is received, the local and server cobalt hashes do not match, and the file will be removed from the download queue. Once the second FindChanges is received, the cobalt hashes match, the conflict is clear again and the file is again removed from the download queue.

In another scenario, after resolving the conflicts in the co-authoring application, the user continues to edit the file. However, the synchronization engine does not receive the SaveProperties calls in time. Instead, the second FindChanges comes sooner than the first SaveProperties call. The two FindChanges simply update the server cobalt hash, and remove the file from the download queue.

The first SaveProperties call sets the resolution but still has the out-of-date local cobalt hash. The second SaveProperties will have the latest local cobalt hash, and the server and local hashes now match. At this point, the synchronization engine is aware that the conflict is resolved and the hold can be released.

In some aspects, the co-authoring application will open the file in an offline mode and will not resolve conflicts (e.g., if the server is unavailable or the synchronization engine is not running when the co-authoring application first opens the file).

If the conflict is resolved in co-authoring application but the file is not uploaded to the server, the synchronization engine will receive neither FindChange nor SaveProperties instructions. Meanwhile, the scanner component cannot calculate the hash if the file is still opened by synchronization engine. So the synchronization engine cannot clear the conflict when the co-authoring application has the file open.

Once the co-authoring application is closed, the scanner component will pick up the changes and identify the changes for uploading to the server. However, because the file is being held, the changes will not be uploaded and the file will remain in the conflict state. Once the co-authoring application is back online, it will auto merge all conflicts, or guide the user to manually resolve conflicts with dialogs such as a pick-a-winner dialog.

Figure 22:
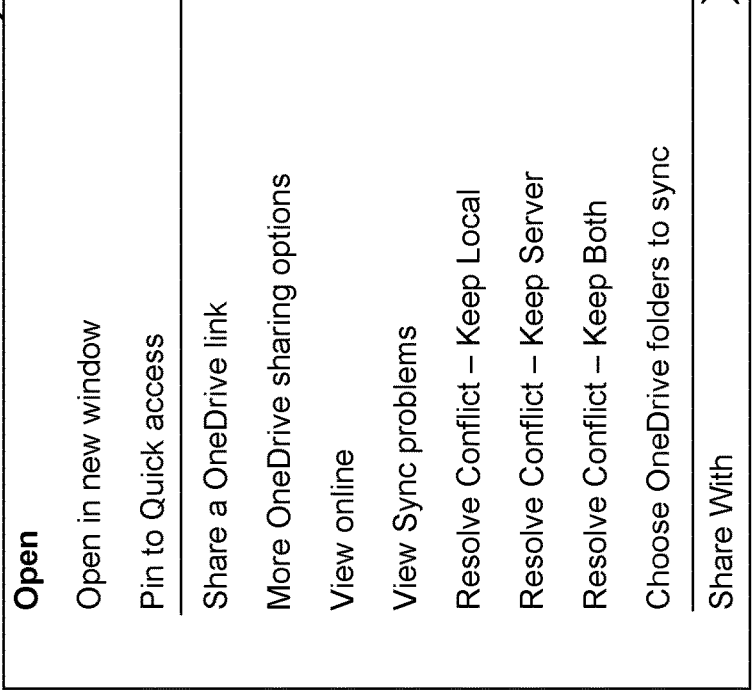
FIG. 22 illustrates an example user interface generated in some aspects on the user computing device of FIG. 1 to guide the user in resolving a file that is being held.

FIG. 22 illustrates an example user interface 2200 generated in some aspects on the user computing device 102 to guide the user in resolving conflicts for a file that is being held. The user interface includes a pop-up menu 2202 that may be displayed when the user actuates (e.g., clicks, right-clicks, touches, etc.) a file that is being held. In some aspects, files that are being held are displayed in directory listing with an icon that indicates the hold status (e.g. a red X). The pop-up menu 2202 may include various commands that relate to resolving the conflict, such as a "view sync problems" command, "Resolve Conflict—Keep Local" command, a "Resolve Conflict—Keep Server" command, and a "Resolve Conflict—Keep Both" command.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 23:
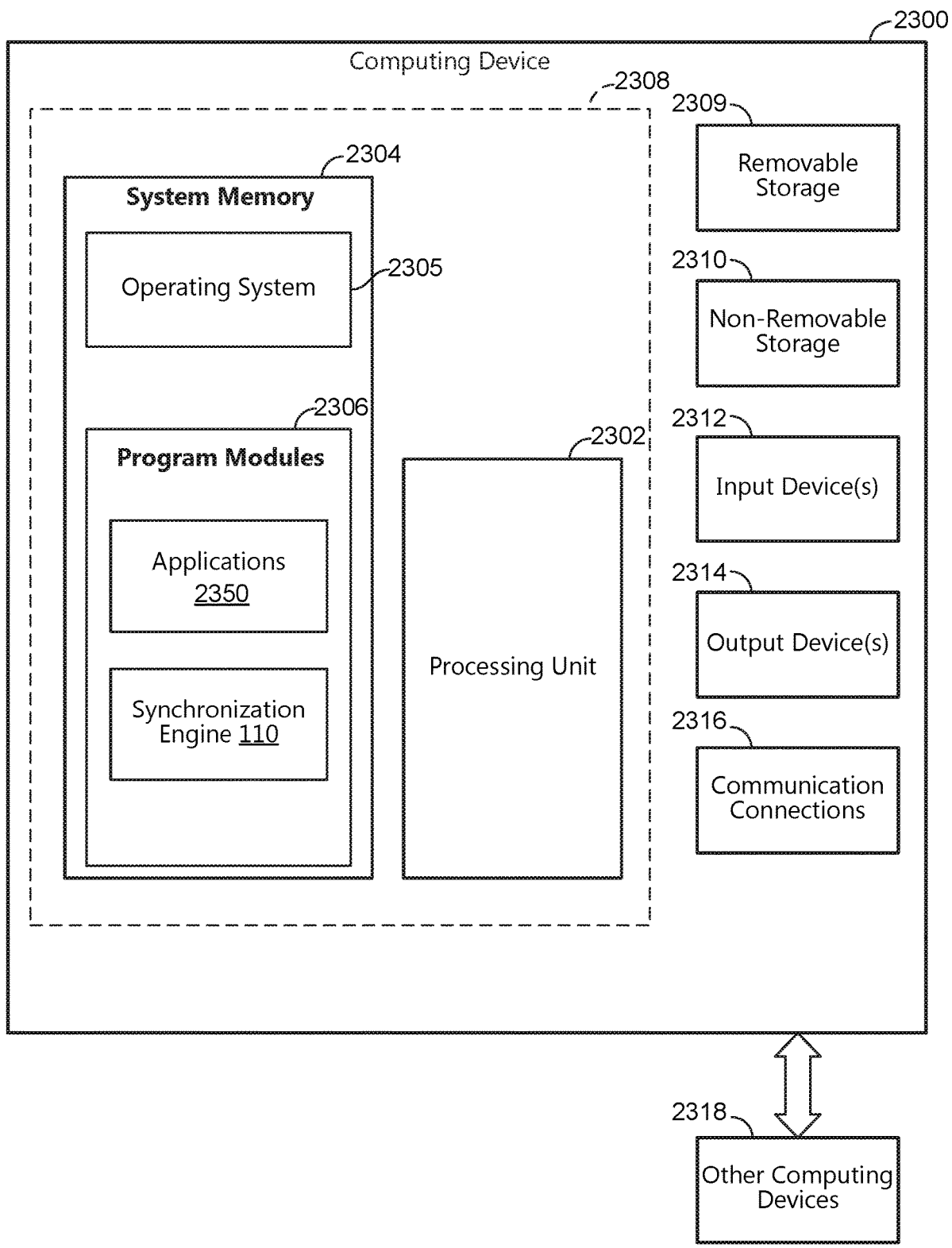
FIG. 23 is a block diagram illustrating example physical components of a computing device.
Figure 24A:
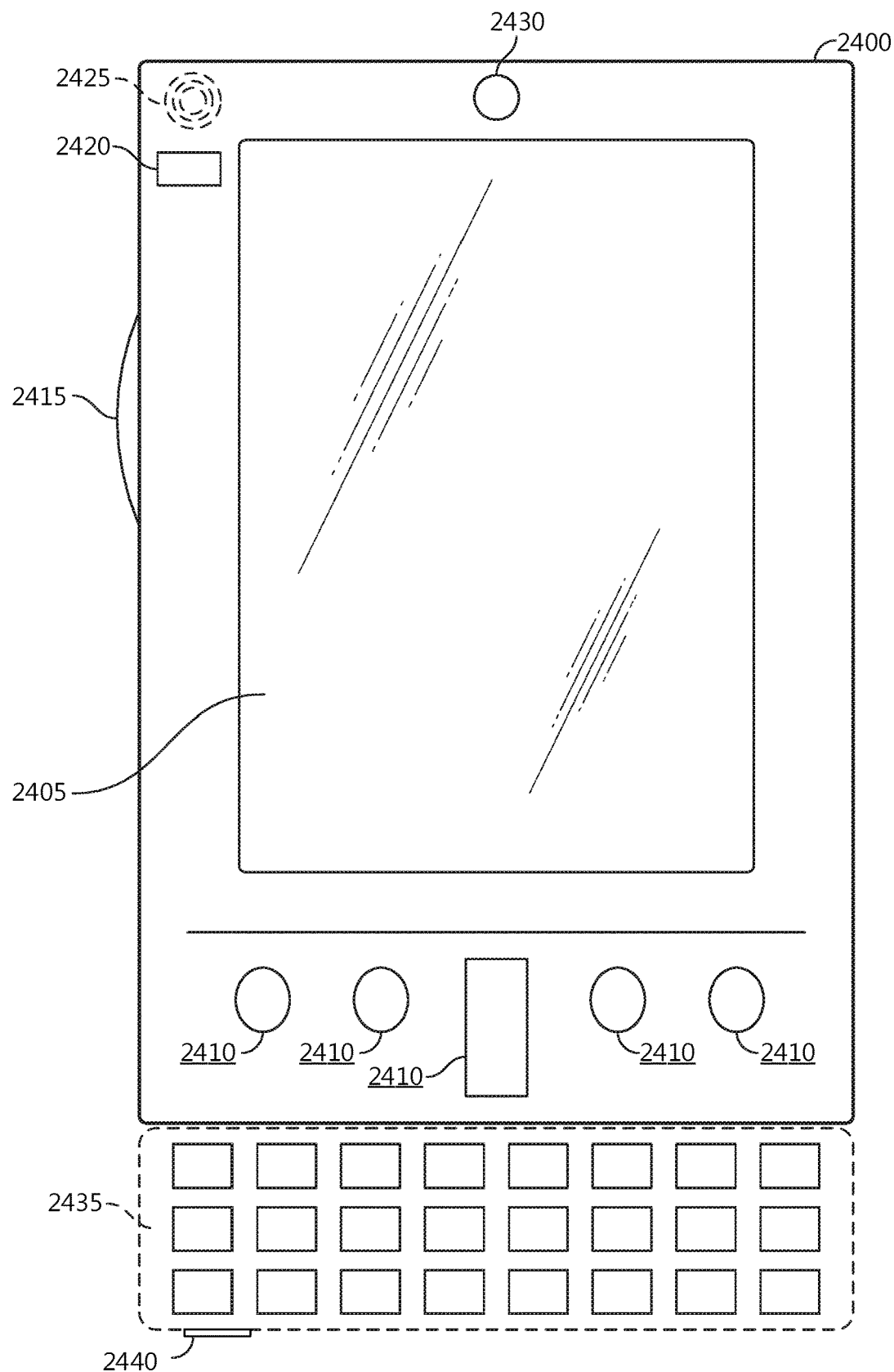
FIGS. 24A and 24B are block diagrams of a mobile computing device.
Figure 24B:
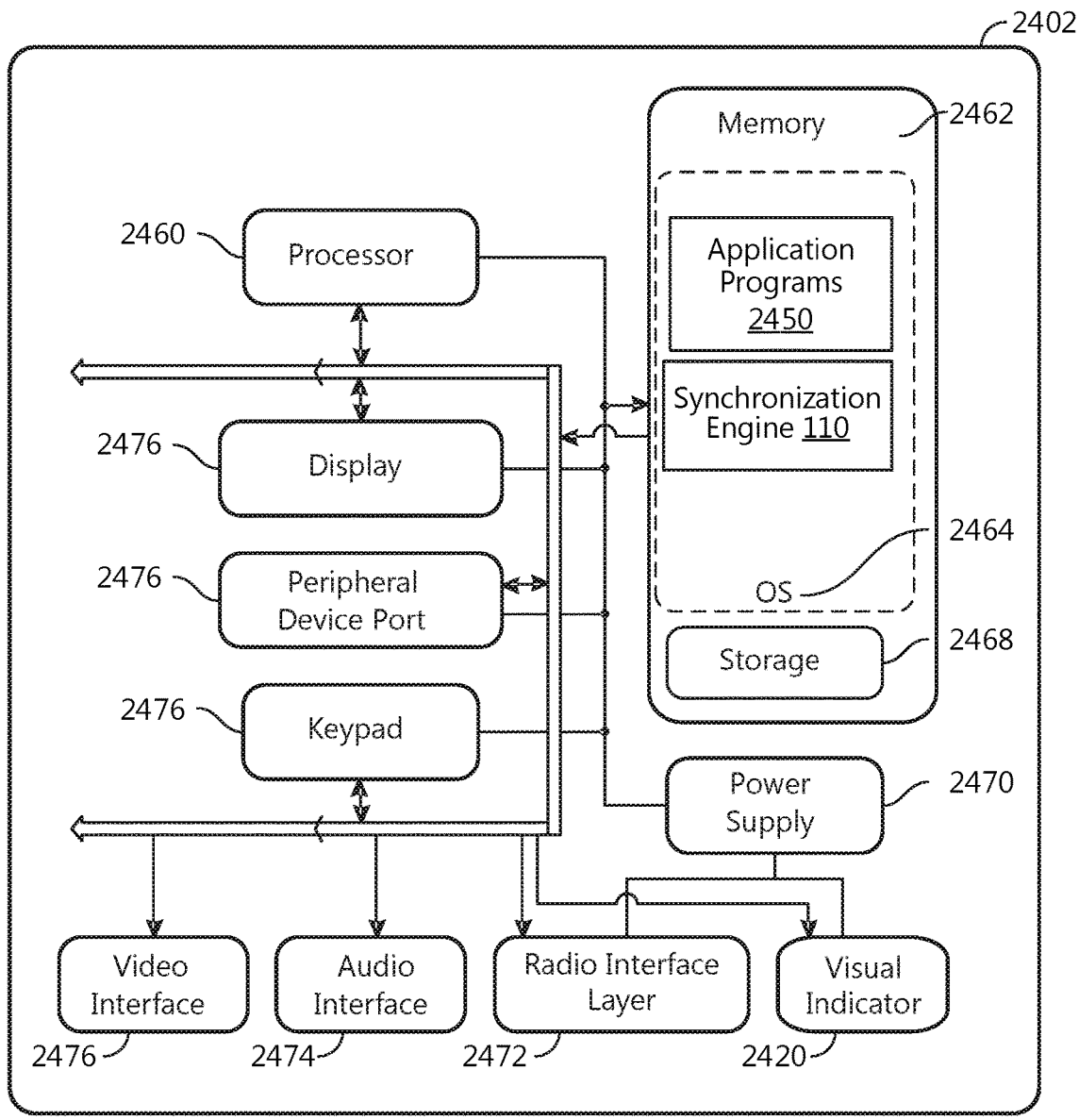
Figure 25:
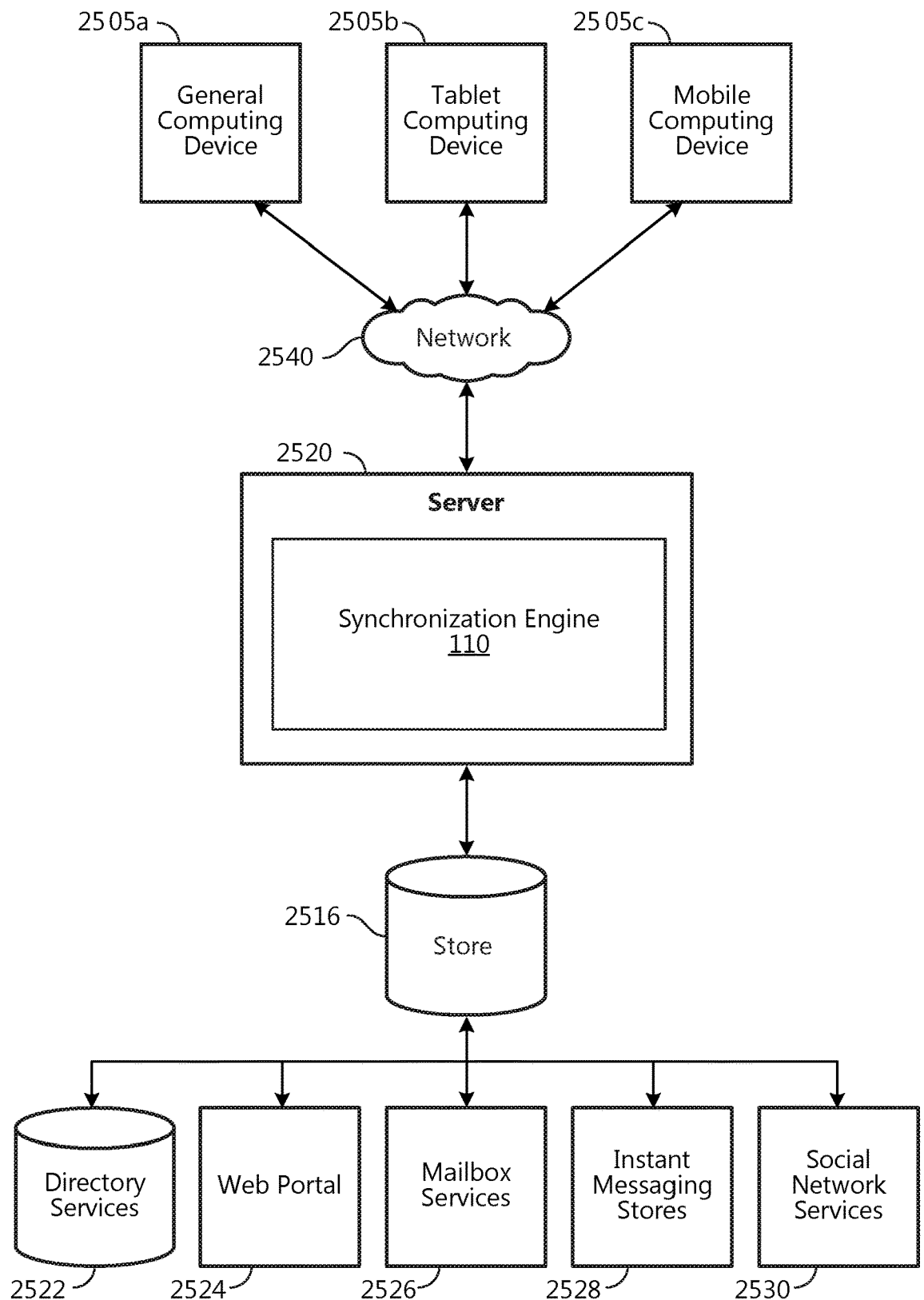
FIG. 25 is a block diagram of a distributed computing system.

FIGS. 23-25 and the associated descriptions provide a discussion of a variety of operating environments in which examples are practiced. However, the devices and systems illustrated and discussed with respect to FIGS. 23-25 are for purposes of example and illustration and are not limiting of a vast number of computing device configurations that are utilized for practicing aspects, described herein.

FIG. 23 is a block diagram illustrating physical components (i.e., hardware) of a computing device 2300 with which examples of the present disclosure may be practiced. In a basic configuration, the computing device 2300 includes at least one processing unit 2302 and a system memory 2304. According to an aspect, depending on the configuration and type of computing device, the system memory 2304 comprises, but is not limited to, volatile storage (e.g., random access memory), non-volatile storage (e.g., read-only memory), flash memory, or any combination of such memories. According to an aspect, the system memory 2304 includes an operating system 2305 and one or more program modules 2306 suitable for running software applications 2350. According to an aspect, the system memory 2304 includes synchronization engine 110. The operating system 2305, for example, is suitable for controlling the operation of the computing device 2300. Furthermore, aspects are practiced in conjunction with a graphics library, other operating systems, or any other application program, and are not limited to any particular application or system. This basic configuration is illustrated in FIG. 23 by those components within a dashed line 2308. According to an aspect, the computing device 2300 has additional features or functionality. For example, according to an aspect, the computing device 2300 includes additional data storage devices (removable and/or non-removable) such as, for example, magnetic disks, optical disks, or tape. Such additional storage is illustrated in FIG. 23 by a removable storage device 2309 and a non-removable storage device 2310.

As stated above, according to an aspect, a number of program modules and data files are stored in the system memory 2304. While executing on the processing unit 2302, the program modules 2306 (e.g., synchronization engine 110) perform processes including, but not limited to, one or more of the stages of the methods illustrated herein, including in FIGS. 2 and 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 23 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 2300 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 2300 has one or more input device(s) 2312 such as a keyboard, a mouse, a pen, a sound input device, a touch input device, etc. The output device(s) 2314 such as a display, speakers, a printer, etc. are also included according to an aspect. The aforementioned devices are examples and others may be used. According to an aspect, the computing device 2300 includes one or more communication connections 2316 allowing communications with other computing devices 2318. Examples of suitable communication connections 2316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 2304, the removable storage device 2309, and the non-removable storage device 2310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 2300. According to an aspect, any such computer storage media is part of the computing device 2300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 24A and 24B illustrate a mobile computing device 2400, for example, a mobile telephone, a smart phone, a tablet personal computer, a laptop computer, and the like, with which aspects may be practiced. With reference to FIG. 24A, an example of a mobile computing device 2400 for implementing the aspects is illustrated. In a basic configuration, the mobile computing device 2400 is a handheld computer having both input elements and output elements. The mobile computing device 2400 typically includes a display 2405 and one or more input buttons 2410 that allow the user to enter information into the mobile computing device 2400. According to an aspect, the display 2405 of the mobile computing device 2400 functions as an input device (e.g., a touch screen display). If included, an optional side input element 2415 allows further user input. According to an aspect, the side input element 2415 is a rotary switch, a button, or any other type of manual input element. In alternative examples, mobile computing device 2400 incorporates more or fewer input elements. For example, the display 2405 may not be a touch screen in some examples. In alternative examples, the mobile computing device 2400 is a portable phone system, such as a cellular phone. According to an aspect, the mobile computing device 2400 includes an optional keypad 2435. According to an aspect, the optional keypad 2435 is a physical keypad. According to another aspect, the optional keypad 2435 is a "soft" keypad generated on the touch screen display. In various aspects, the output elements include the display 2405 for showing a graphical user interface (GUI), a visual indicator 2420 (e.g., a light emitting diode), and/or an audio transducer 2425 (e.g., a speaker). In some examples, the mobile computing device 2400 incorporates a vibration transducer for providing the user with tactile feedback. In yet another example, the mobile computing device 2400 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 2400 incorporates peripheral device port 2440, such as an audio input (e.g., a microphone jack), an audio output (e.g., a headphone jack), and a video output (e.g., a HDMI port) for sending signals to or receiving signals from an external device.

FIG. 24B is a block diagram illustrating the architecture of one example of a mobile computing device. That is, the mobile computing device 2400 incorporates a system (i.e., an architecture) 2402 to implement some examples. In one example, the system 2402 is implemented as a "smart phone" capable of running one or more applications (e.g., browser, e-mail, calendaring, contact managers, messaging clients, games, and media clients/players). In some examples, the system 2402 is integrated as a computing device, such as an integrated personal digital assistant (PDA) and wireless phone.

According to an aspect, one or more application programs 2450 are loaded into the memory 2462 and run on or in association with the operating system 2464. Examples of the application programs include phone dialer programs, e-mail programs, personal information management (PIM) programs, word processing programs, spreadsheet programs, Internet browser programs, messaging programs, and so forth. According to an aspect, synchronization engine 110 is loaded into memory 2462. The system 2402 also includes a non-volatile storage area 2468 within the memory 2462. The non-volatile storage area 2468 is used to store persistent information that should not be lost if the system 2402 is powered down. The application programs 2450 may use and store information in the non-volatile storage area 2468, such as e-mail or other messages used by an e-mail application, and the like. A synchronization application (not shown) also resides on the system 2402 and is programmed to interact with a corresponding synchronization application resident on a host computer to keep the information stored in the non-volatile storage area 2468 synchronized with corresponding information stored at the host computer. As should be appreciated, other applications may be loaded into the memory 2462 and run on the mobile computing device 2400.

According to an aspect, the system 2402 has a power supply 2470, which is implemented as one or more batteries. According to an aspect, the power supply 2470 further includes an external power source, such as an AC adapter or a powered docking cradle that supplements or recharges the batteries.

According to an aspect, the system 2402 includes a radio 2472 that performs the function of transmitting and receiving radio frequency communications. The radio 2472 facilitates wireless connectivity between the system 2402 and the "outside world," via a communications carrier or service provider. Transmissions to and from the radio 2472 are conducted under control of the operating system 2464. In other words, communications received by the radio 2472 may be disseminated to the application programs 2450 via the operating system 2464, and vice versa.

According to an aspect, the visual indicator 2420 is used to provide visual notifications and/or an audio interface 2474 is used for producing audible notifications via the audio transducer 2425. In the illustrated example, the visual indicator 2420 is a light emitting diode (LED) and the audio transducer 2425 is a speaker. These devices may be directly coupled to the power supply 2470 so that when activated, they remain on for a duration dictated by the notification mechanism even though the processor 2460 and other components might shut down for conserving battery power. The LED may be programmed to remain on indefinitely until the user takes action to indicate the powered-on status of the device. The audio interface 2474 is used to provide audible signals to and receive audible signals from the user. For example, in addition to being coupled to the audio transducer 2425, the audio interface 2474 may also be coupled to a microphone to receive audible input, such as to facilitate a telephone conversation. According to an aspect, the system 2402 further includes a video interface 2476 that enables an operation of an on-board camera 2430 to record still images, video stream, and the like.

According to an aspect, a mobile computing device 2400 implementing the system 2402 has additional features or functionality. For example, the mobile computing device 2400 includes additional data storage devices (removable and/or non-removable) such as, magnetic disks, optical disks, or tape. Such additional storage is illustrated in FIG. 24B by the non-volatile storage area 2468.

According to an aspect, data/information generated or captured by the mobile computing device 2400 and stored via the system 2402 are stored locally on the mobile computing device 2400, as described above. According to another aspect, the data are stored on any number of storage media that are accessible by the device via the radio 2472 or via a wired connection between the mobile computing device 2400 and a separate computing device associated with the mobile computing device 2400, for example, a server computer in a distributed computing network, such as the Internet. As should be appreciated such data/information are accessible via the mobile computing device 2400 via the radio 2472 or via a distributed computing network. Similarly, according to an aspect, such data/information are readily transferred between computing devices for storage and use according to well-known data/information transfer and storage means, including electronic mail and collaborative data/information sharing systems.

FIG. 25 illustrates one example of the architecture of a system for file synchronization pausing for individual files. Content developed, interacted with, or edited in association with the synchronization engine 110 is enabled to be stored in different communication channels or other storage types. For example, various documents may be stored using a directory service 2522, a web portal 2524, a mailbox service 2526, an instant messaging store 2528, or a social networking site 2530. The synchronization engine 110 is operative to use any of these types of systems or the like for managing synchronized files in a co-authoring session or while editing individually, as described herein. According to an aspect, a server 2520 provides the synchronization engine 110 to clients 2505a,b,c. As one example, the server 2520 is a web server providing the synchronization engine 110 over the web. The server 2520 provides the synchronization engine 110 over the web to clients 2505 through a network 2540. By way of example, the client computing device is implemented and embodied in a personal computer 2505a, a tablet computing device 2505b or a mobile computing device 2505c (e.g., a smart phone), or other computing device. Any of these examples of the client computing device are operable to obtain content from the store 2516.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for synchronizing files between a local file system and a server, comprising:
    at least one processor; and
    memory, operatively connected to the at least one processor and storing instructions that, when executed by the at least one processor, cause the at least one processor to:
        access a file stored on the local file system for synchronization with an associated file on the server;
        determine whether differences between the file and the associated file prevent synchronization of the file and the associated file;
        when determined that differences between the file and the associated file prevent synchronization of the file and the associated file, place the file in a hold state, wherein the hold state pauses synchronization of content in the file with content of the associated file; and
        while in the hold state, automatically synchronize a topological change to the file with the associated file, wherein the topological change indicates one of a move of the file to another directory in the local file system or a renaming of the file.

2. The system of claim 1, wherein the memory stores further instructions that cause the processor to:
    receive an additional change to the file, wherein the additional change relates to topology of the file; and
    transmit the additional change to the server for application to the associated file stored on the server.

3. The system of claim 1, wherein the memory stores further instructions that cause the processor to:
    determine that the content of the file is no longer different than the content of the associated file on the server; and
    remove the hold.

4. The system of claim 1, wherein to determine whether differences between the file and the associated file prevent synchronization of the file and the associated file, the memory stores further instructions that cause the processor to:
    determine whether the content of the file has been changed since a most recent synchronization event;
    determine whether the content of the associated file has been changed since the most recent synchronization event; and
    when determined that the content of the file has been changed since the most recent synchronization event and that the content of the associated file has been changed since the most recent synchronization event, determine that differences between the file and the associated file prevent synchronization of the file and the associated file.

5. The system of claim 4, wherein to determine whether the content of the file has been changed since a most recent synchronization event, a hash value for the content of the file is compared to a stored hash value, the stored hash value corresponding to a hash value for the file calculated at a time of the most recent synchronization event.

6. The system of claim 1, wherein the file is accessed in response to scanning a directory on the local file system.

7. The system of claim 1, wherein the file is accessed in response to receiving changes from the server.

8. The system of claim 1, wherein placing the file in a hold state comprises setting a hold field in a database associated with the file.

9. The system of claim 1, wherein the memory stores further instructions that cause the processor to access, after placing the file in the hold state, a second file stored on the local file system for synchronization with a second associated file on the server.

10. A method for synchronizing files between a local file system and a server, comprising:
    accessing a file stored on a local file system for synchronization with an associated file on a server;
    determining whether differences between the file and the associated file prevent synchronization of the file and the associated file;

when determined that differences between the file and the associated file prevent synchronization of the file and the associated file, placing the file in a hold state, wherein the hold state pauses synchronization of content in the file with content of the associated file; and while in the hold state, automatically synchronizing a topological change to the file with the associated file, wherein the topological change indicates one of a move of the file to another directory in the local file system or a renaming of the file.

11. The method of claim 10, wherein a second topological change is one of a renaming of the file or a moving of the file to another directory.

12. The method of claim 11, further comprising:
receiving an additional change to the file, wherein the additional change relates to topology of the file; and
transmitting the additional change to the server for application to the associated file stored on the server.

13. The method of claim 10, further comprising:
determining that the content of the file is no longer different than the content of the associated file on the server; and
removing the hold.

14. The method of claim 10, wherein determining whether differences between the file and the associated file prevent synchronization of the file and the associated file comprises:
determining whether the content of the file has been changed since a most recent synchronization event;
determining whether the content of the associated file has been changed since the most recent synchronization event; and
when determined that the content of the file has been changed since the most recent synchronization event and that the content of the associated file has been changed since the most recent synchronization event, determining that differences between the file and the associated file prevent synchronization of the file and the associated file.

15. The method of claim 14, wherein determining whether the content of the file has been changed since a most recent synchronization event comprises:
comparing a hash value for the content of the file to a stored hash value, the stored hash value corresponding to a hash value for the file calculated at a time of the most recent synchronization event.

16. The method of claim 10, wherein the file is accessed in response to scanning a directory on the local file system.

17. The method of claim 10, wherein the file is accessed in response to receiving changes from the server.

18. The method of claim 10, wherein placing the file in a hold state comprises setting a hold field in a database associated with the file.

19. A computer storage medium containing computer executable instructions which, when executed by a computer, perform a method for synchronizing files between a local file system and a server, the method comprising:
accessing a file stored on a local file system for synchronization with an associated file on a server;
determining whether differences between the file and the associated file prevent synchronization of the file and the associated file;
when determined that differences between the file and the associated file prevent synchronization of the file and the associated file, placing the file in a hold state, wherein the hold state pauses synchronization of content in the file with content of the associated file; and
while in the hold state, automatically synchronizing a topological change to the file with the associated file, wherein the topological change indicates one of a move of the file to another directory in the local file system or a renaming of the file.

* * * * *